United States Patent
Gan et al.

(10) Patent No.: US 12,481,804 B2
(45) Date of Patent: Nov. 25, 2025

(54) CUTTER AND DRILL BIT DESIGN BY VIRTUAL TESTING WITH DIGITIZED ROCKS

(71) Applicant: Schlumberger Technology Corporation, Sugar Land, TX (US)

(72) Inventors: Xiaoge Gan, Houston, TX (US); Ke Chen, Houston, TX (US); Yansong Huang, Beijing (CN); Paul Bolchover, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 981 days.

(21) Appl. No.: 17/454,723

(22) Filed: Nov. 12, 2021

(65) Prior Publication Data

US 2022/0156429 A1 May 19, 2022

Related U.S. Application Data

(60) Provisional application No. 63/198,800, filed on Nov. 13, 2020.

(51) Int. Cl.
*G06F 30/17* (2020.01)
*E21B 41/00* (2006.01)
*G06F 111/10* (2020.01)

(52) U.S. Cl.
CPC .............. *G06F 30/17* (2020.01); *E21B 41/00* (2013.01); *E21B 2200/20* (2020.05); *G06F 2111/10* (2020.01)

(58) Field of Classification Search
CPC ...... G06F 30/17; G06F 2111/10; E21B 41/00; E21B 2200/20
USPC ............................................................ 703/1
See application file for complete search history.

(56) References Cited

U.S. PATENT DOCUMENTS

| | | | |
|---|---|---|---|
| 6,516,293 B1 | 2/2003 | Huang et al. | |
| 6,785,641 B1 | 8/2004 | Huang | |
| 6,816,787 B2 * | 11/2004 | Ramamoorthy | G01V 11/00 702/7 |
| 6,873,947 B1 | 3/2005 | Huang et al. | |
| 7,139,689 B2 | 11/2006 | Huang | |
| 7,464,013 B2 | 12/2008 | Huang et al. | |
| 7,693,695 B2 | 4/2010 | Huang et al. | |
| 7,844,426 B2 * | 11/2010 | Huang | E21B 44/00 703/6 |
| 8,401,831 B2 * | 3/2013 | Tang | G06F 30/17 703/7 |
| 9,134,457 B2 * | 9/2015 | Hurley | G01V 20/00 |
| 9,507,047 B1 * | 11/2016 | Dvorkin | G01V 5/101 |
| 10,927,671 B1 * | 2/2021 | Tonner | E21B 21/01 |
| 11,249,002 B2 * | 2/2022 | Nie | G01N 15/088 |

(Continued)

OTHER PUBLICATIONS

Ihsan Berk Tulu (Modeling PDC cutter rock interaction, West Virginia University, 2009, pp. 1-69) (Year: 2009).*

(Continued)

*Primary Examiner* — Iftekhar A Khan
(74) *Attorney, Agent, or Firm* — Jeffrey D. Frantz

(57) ABSTRACT

A method for designing a drill bit includes simulating a cutting element cutting a digitized rock sample, storing outputs from the simulating in a digital rock interaction file, modeling the drill bit to have at least one of the cutting element, and using data in the digital rock interaction file to simulate the drill bit in a drilling operation.

7 Claims, 15 Drawing Sheets

(56) References Cited

U.S. PATENT DOCUMENTS

| | | | | |
|---|---|---|---|---|
| 11,255,997 | B2* | 2/2022 | Raterman | G01V 1/42 |
| 11,585,213 | B1* | 2/2023 | Tonner | E21B 21/01 |
| 2004/0014342 | A1 | 1/2004 | Yu et al. | |
| 2004/0211596 | A1 | 10/2004 | Huang | |
| 2005/0010382 | A1 | 1/2005 | Oliver et al. | |
| 2005/0096847 | A1 | 5/2005 | Huang | |
| 2008/0262810 | A1* | 10/2008 | Moran | E21B 7/00 |
| | | | | 703/10 |
| 2012/0221306 | A1* | 8/2012 | Hurley | G01V 20/00 |
| | | | | 703/6 |
| 2013/0301794 | A1* | 11/2013 | Grader | G01N 23/087 |
| | | | | 378/5 |
| 2013/0308831 | A1* | 11/2013 | Dvorkin | G06T 7/0004 |
| | | | | 382/109 |
| 2016/0025895 | A1* | 1/2016 | Ziauddin | G01V 20/00 |
| | | | | 702/11 |
| 2016/0202390 | A1* | 7/2016 | Ramsay | E21B 49/005 |
| | | | | 703/6 |
| 2016/0306074 | A1* | 10/2016 | Andersen | G01V 99/00 |
| 2016/0319640 | A1* | 11/2016 | Ratulowski | G06F 30/20 |
| 2017/0108483 | A1* | 4/2017 | Clark | G01N 33/24 |
| 2017/0277812 | A1* | 9/2017 | Holland | E21B 49/02 |
| 2018/0238774 | A1* | 8/2018 | Amendt | G01N 33/24 |
| 2018/0246066 | A1* | 8/2018 | Rhodes | G01N 29/42 |
| 2018/0252076 | A1* | 9/2018 | Bryant | E21B 43/16 |
| 2019/0227087 | A1* | 7/2019 | Belani | G01N 33/24 |
| 2019/0292898 | A1* | 9/2019 | Quattrone | G05B 13/0265 |
| 2020/0102792 | A1* | 4/2020 | Chen | G06F 30/28 |
| 2020/0157929 | A1* | 5/2020 | Torrione | G01N 33/24 |
| 2020/0320390 | A1* | 10/2020 | Huang | G06F 18/214 |
| 2021/0208050 | A1* | 7/2021 | Alsumaiti | G06F 30/27 |
| 2021/0349070 | A1* | 11/2021 | Gettemy | G06T 7/97 |
| 2022/0003651 | A1* | 1/2022 | Ramsay | G01N 33/24 |
| 2022/0327713 | A1* | 10/2022 | Maximo | G06N 3/045 |
| 2022/0334552 | A1* | 10/2022 | Higgs, III | E21B 10/42 |
| 2023/0229827 | A1* | 7/2023 | Alabbad | G01N 23/046 |
| | | | | 703/6 |
| 2023/0235649 | A1* | 7/2023 | Drexler | E21B 43/082 |
| | | | | 166/228 |

OTHER PUBLICATIONS

Zhu et al. (An efficiently dynamic stress strain simulation method on digital rock, Journal of Applied Geophysics 147 (2017) 10-15) (Year: 2017).*

Derzhi et al. (Comparison of Traditional and Digital Rock Physics Techniques to Determine the Elastic Core Parameters in Cretaceous formations, Abu Dhabi, SPE, 2010, pp. 1-8) (Year: 2010).*

Dou Xie et al., Application of an innovative ridge-ladder-shaped polycrystalline diamond compact cutter to reduce vibration and improve drilling speed. Science Progress, VI. 103(3), pp. 1-20, 2020.

Akbari, et al., "A linearized formulation of AC multi-year transmission expansion planning: A mixed-integer linear programming approach," Electric Power Systems Research, 2014, vol. 114, pp. 93-100.

Dagrain, F. et al., "Influence of cutter geometry in rock cutting", ARMA-01-0927, presented at the DC Rocks 2001, The 38th U.S. Sumposium on Rock Mechanics, Jul. 2001, pp. 927-933.

Detournay, et al., "A phenomenological model for the drilling action of drag bits," International Journal of Rock Mechanics and Mining Sciences and Geomechanics Abstracts, vol. 29, Issue 1, pp. 13-23, Jan. 1992.

Melo, et al., "A Single Euler Solution Per Anomaly," 76th EAGE Conference & Exhibition 2014, Amsterdam RAI, The Netherlands, Jun. 16-19, 2014.

Rahmani, et al., "Design and management of high-performance, reliable and thermal-aware 3D networks-on-chip," IET Circuits, Devices, Systems, Sep. 2012, vol. 6, Issue 5, pp. 308-321.

Notice of Allowance issued in U.S. Appl. No. 16/838,649 dated Oct. 3, 2022, 9 pages.

* cited by examiner

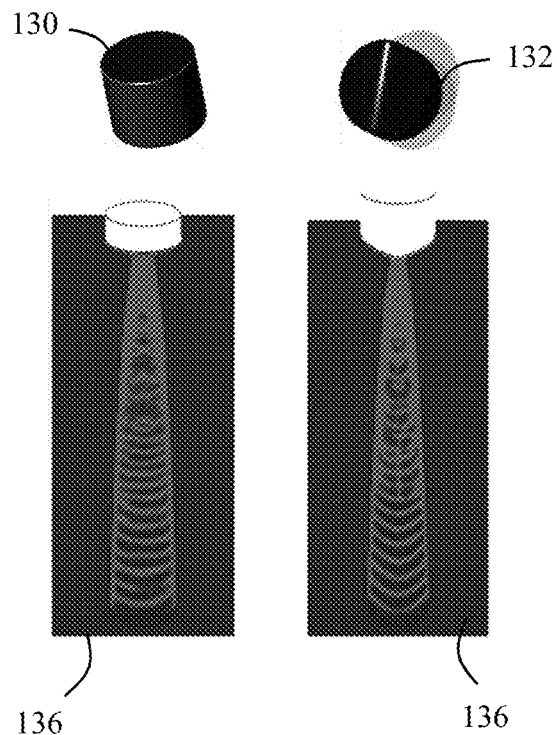
FIG. 16
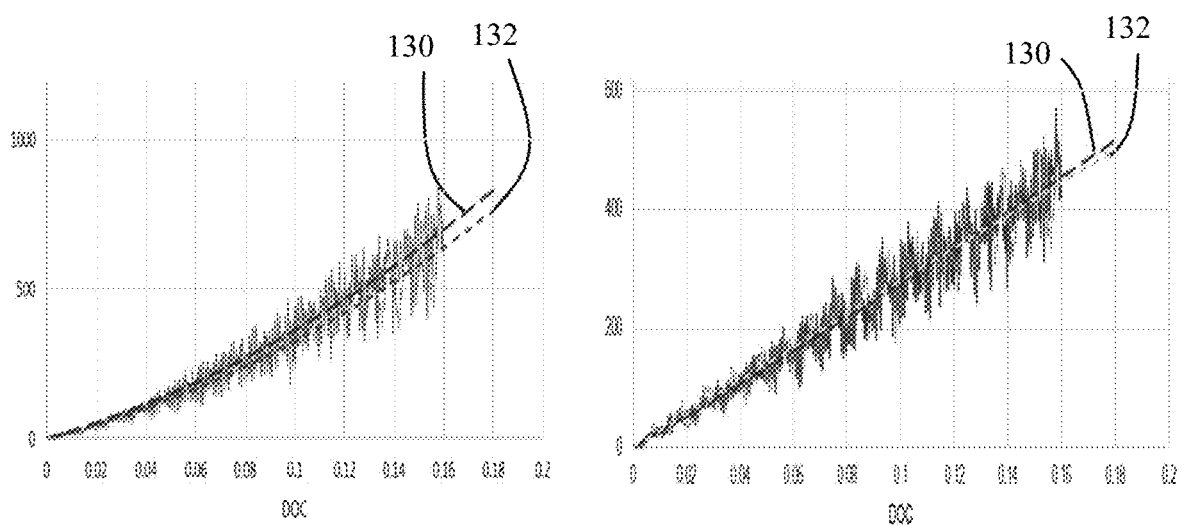
FIG. 17
FIG. 18

CUTTER AND DRILL BIT DESIGN BY VIRTUAL TESTING WITH DIGITIZED ROCKS

CROSS-REFERENCE TO RELATED APPLICATIONS

This application claims the benefit of, and priority to, U.S. Patent Application No. 63/198,800 entitled "Cutter and Drill Bit Design by Virtual Testing with Digitized Rocks" filed Nov. 13, 2020, which is incorporated herein by this reference in its entirety.

BACKGROUND

Cutting elements used in down-hole drilling operations are often made with a super hard material layer to penetrate hard and abrasive earthen formations. For example, cutting elements may be mounted to drill bits (e.g., rotary drag bits), such as by brazing, for use in a drilling operation. FIG. 22 shows an example of a fixed cutter drill bit 220 (sometimes referred to as a drag bit) having a plurality of cutting elements 228 mounted thereto for drilling a formation. The drill bit 220 includes a bit body 222 having an externally threaded connection at one end 224, and a plurality of blades 226 extending from the other end 225 of bit body 222 and forming the cutting surface of the bit 220. A plurality of cutters 228 are attached to each of the blades 226 and extend from the blades to cut through earth formations when the bit 220 is rotated about its longitudinal axis 221 during drilling. The cutters 228 may deform the earth formation by scraping and shearing.

Super hard material layers of a cutting element may be formed under high temperature and pressure conditions, usually in a press apparatus designed to create such conditions, cemented to a carbide substrate containing a metal binder or catalyst such as cobalt. For example, polycrystalline diamond (PCD) is a super hard material used in the manufacture of cutting elements, where PCD cutters typically comprise diamond material formed on a supporting substrate (typically a cemented tungsten carbide (WC) substrate) and bonded to the substrate under high temperature, high pressure (HTHP) conditions.

A PCD cutting element may be fabricated by placing a cemented carbide substrate into a container or cartridge with a layer of diamond crystals or grains loaded into the cartridge adjacent one face of the substrate. A number of such cartridges are typically loaded into a reaction cell and placed in the HPHT apparatus. The substrates and adjacent diamond grain layers are then compressed under HPHT conditions which promotes a sintering of the diamond grains to form a polycrystalline diamond structure. As a result, the diamond grains become mutually bonded to form a diamond layer over the substrate interface. The diamond layer is also bonded to the substrate interface.

Such cutting elements are often subjected to intense forces, torques, vibration, high temperatures and temperature differentials during operation. As a result, stresses within the structure may begin to form. Drag bits for example may exhibit stresses aggravated by drilling anomalies during well boring operations such as bit whirl or bounce, resulting in spalling, delamination, or fracture of the super hard material layer or the substrate thereby reducing or eliminating the cutting elements efficacy and decreasing overall drill bit wear life.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods of designing a drill bit that include simulating a cutting element cutting a digitized rock sample, storing outputs from the simulating in a digital rock interaction file, modeling the drill bit to have at least one of the cutting element, and using data in the digital rock interaction file to simulate the drill bit in a drilling operation.

In another aspect, embodiments of the present disclosure relate to methods that include modeling a rock using a computer modeling program to form a digitized rock sample, simulating a stress on the digitized rock sample to output a simulated failure mode, replicating the stress on a physical sample of the rock until a physical failure occurs in the physical sample, comparing the physical failure to the simulated failure mode, altering at least one parameter of the digitized rock sample based on the comparison of the physical failure to the simulated failure mode, repeating the modeling, simulating, replicating, comparing, and altering to provide multiple digitized rock samples, and storing the multiple digitized rock samples in a digital rock library.

In yet another aspect, embodiments of the present disclosure relate to methods that include providing a digital rock library containing a plurality of digitized rock samples, providing a plurality of digital rock interaction files, the digital rock interaction files comprising reaction forces generated from simulations of at least one cutting element cutting at least one of the digitized rock samples, inputting at least one of the digital rock interaction files into a computer aided simulation software, and using the computer aided simulation software to simulate a drill bit drilling a formation.

Other aspects and advantages of the claimed subject matter will be apparent from the following description and the appended claims.

BRIEF DESCRIPTION OF DRAWINGS

FIGS. 16-18 show examples of virtual testing results in accordance with one or more embodiments of the present disclosure.

DETAILED DESCRIPTION

In one aspect, embodiments disclosed herein relate to methods for designing and optimizing elements of drilling by conducting virtual testing or simulations in a digital rock lab. A digital rock lab may be used herein to refer to a virtual testing platform for design and optimization of cutting elements (e.g., new cutting element shapes and/or cutting element materials) and for virtually testing cutting element interactions with different rock samples. Rock samples may be modeled, for example, from rock mechanics and based on real experimental and field data, to provide digitized rock samples, which may be saved in a digital rock library. Digitized rock samples may be accessed in the digital rock lab, and real cutting element interactions with the digitized rock samples (e.g., a cutting element cutting the rock sample at a selected orientation under a given speed) may be simulated to generate digital rock interaction files. Such digital rock interaction files may be readily inputted into drilling simulations when simulating comparable cutting element interactions with a formation. A digital rock lab may replace traditional development methods of using physical rock samples to provide testing prove outs. As used herein, the terms "real" and "physical" may be interchangeably used to describe something that may be observed in the world, outside of a computer. Thus, while computer-generated models and simulations may be seen and manipulated (via computer programs), they may be referred to herein as being "virtual" and are distinguished from "real" or "physical" objects described herein.

According to embodiments of the present disclosure, methods for designing and optimizing elements of drilling in a digital rock lab may include three levels of simulation design: 1) on a micro-scale, rock samples may be digitally modeled at the grain size to produce digitized rock samples; 2) on a meso-macro scale, cutting element and rock interactions may be simulated to generate digital rock interaction files; and 3) on an application level, where cutting elements may be simulated in an application, e.g., on a bit drilling a formation. The design elements from each level of simulation design may be compared with field data and/or other comparable physical data to update and improve accuracy in the simulated models and interactions, for example, using machine learning.

Figure 1:
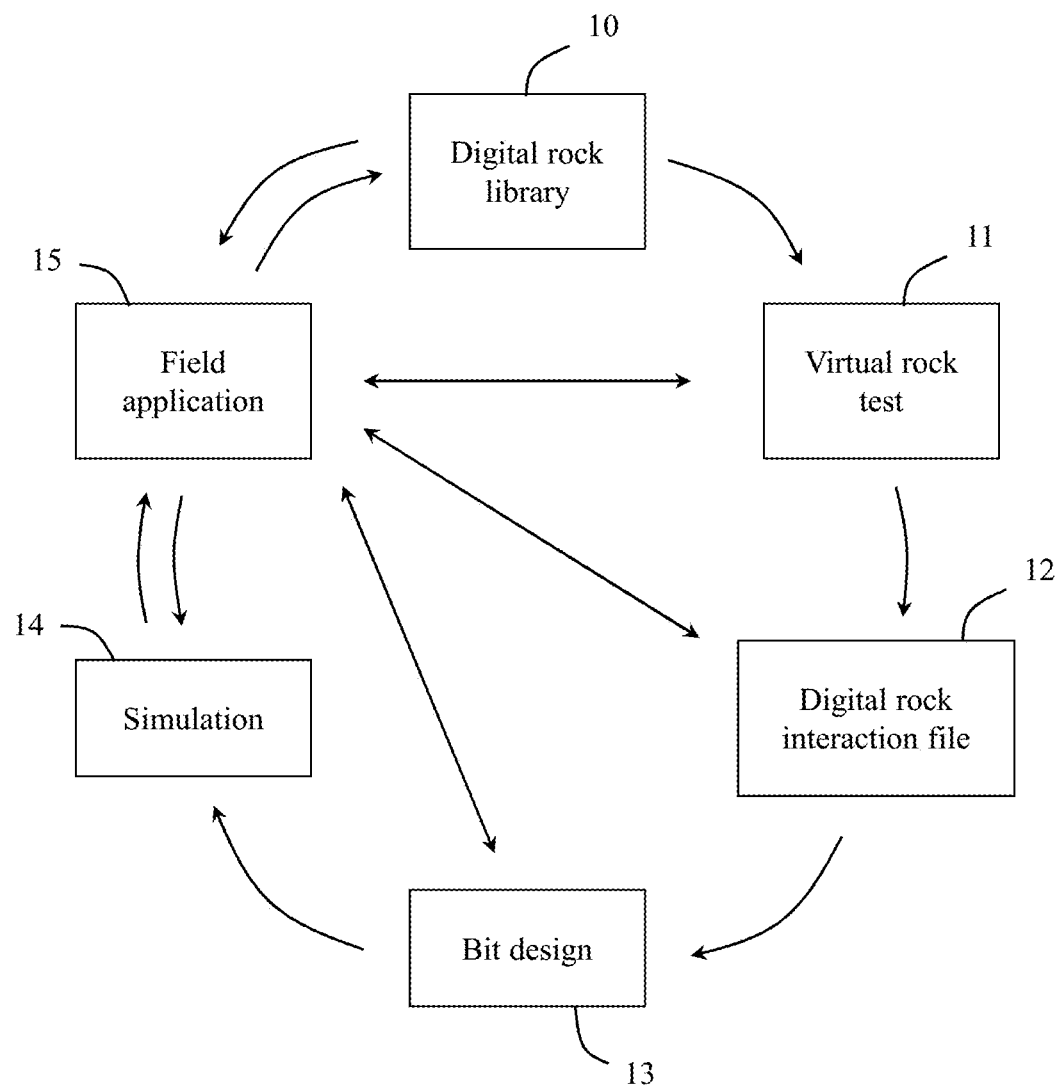
FIG. 1 shows a system in accordance with one or more embodiments of the present disclosure.

FIG. 1 shows an example of a research and development method using a digital rock lab according to embodiments of the present disclosure. As shown, one or more digitized rock samples may be modeled of different rocks and stored in a digital rock library 10. A computer-generated model of a cutting element may be simulated as interacting with the digitized rock samples (e.g., cutting a digitized rock sample) in a virtual rock test 11. Cutting element and rock interaction parameters from the virtual rock test, including, for example, reaction forces (e.g., resulting shear forces, vertical forces, normal forces), depth of cut, speed of the cutting element, etc. may be stored in a digital rock interaction file 12. Digital rock interaction files may then be used in bit design 13. For example, a simulation software used to model a drill bit (e.g., Integrated Dynamic Energy Analysis Simulation (IDEAS) software) may search, sort, and/or pull data from digital rock interaction files to model cutting elements on the drill bit having rock interaction parameters from the digital rock interaction file(s). The simulation software may simulate 14 the modeled drill bit drilling a formation having one or more of the digitized rock samples used in creating the digital rock interaction file(s), from which rock interaction parameters may be pulled to aid in simulating how the modeled drill bit will interact with the formation.

Field applications 15 using drill bits, cutting elements, and/or rock having comparable properties with those simulated in the research and development stage may be used to improve the simulations by comparing simulated results with real world results and updating mismatched simulations to more accurately reflect real world interactions. In such manner, one or more steps in the research and development stage may be self-learning from field applications. Operations from the field that may be used to compare and update simulations may be from field applications conducted before, after, or during simulations. For example, cutting element performance data may be collected from an ongoing drilling operation drilling through a first type of formation rock, which may be compared to results in a digital rock interaction file between comparable modeled cutting elements and digitized rock samples of the first type of formation rock.

Digital Rock Lab

A digital rock lab according to embodiments of the present disclosure may include at least one of a digital rock library (including files of one or more digitized rock samples), digital rock interaction files, and one or more computer simulation programs that may model cutting elements and simulate modeled cutting element interacting with digitized rock samples to output the digital rock interaction files. The components of a digital rock lab (e.g., digitized rock samples and/or digital rock interaction files) may be used to aid in cutting element application design, for example, in the design of drill bits and/or in the design of a well or drilling plan. Elements of a digital rock lab are described below in more detail.

Digital Rock Library

According to embodiments of the present disclosure, a physical rock sample may be modeled based on at least one of advanced rock mechanics, analytical models, damage mechanics (e.g., failure initiation and propagation modes), finite element methods, particle methods, discrete element methods, extended finite element methods, meshless finite element methods, other numerical analysis approaches, and real experimental and field data to obtain a digitized rock sample. A digitized rock sample may be modeled to simulate the composition and material properties of a physical rock sample. For example, a digitized rock sample may be modeled to be formed of grains defined between grain boundaries that mimic a grain structure and composition of a physical rock. In some embodiments, a digitized rock sample may be a model of a rock having a homogeneous composition. In some embodiments, a digitized rock sample may be modeled to have randomized or heterogeneous features, such as grain inclusions, different grain orientations, or multiple types of compositions (e.g., sedimentary type rocks).

Digitized rock samples may also be modeled to have selected material properties, which may be defined through the computer program used to generate the digitized rock sample. For example, a digitized rock sample may be defined as having one or more material properties selected from normal stiffness ($k_n$), normal to shear stiffness ratio ($k_n/k_s$), peak cohesion ($c_p$), residual cohesion ($c_r$), peak tensile strength ($T_p$), residual tensile strength ($T_r$), peak friction ($\phi_p$), residual friction ($\phi_r$), grain Young's modulus (E), grain Poisson's ratio (v), internal friction angle ($\phi$), fracture energy (J), and grain length to width ratio (l/w).

Figure 2:
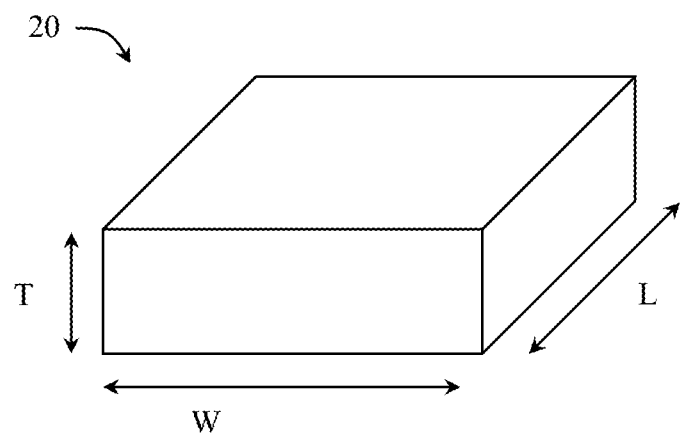
FIG. 2 shows a digitized rock sample in accordance with one or more embodiments of the present disclosure.

FIGS. 2-5 show examples of digitized rock samples, as they may appear modeled and displayed on a computer display (e.g., screen). In FIG. 2, a digitized rock sample 20 may be modeled to have an isotropic uniform rock composition, e.g., limestone, sandstone, or shale. The homogeneous composition may be modeled by defining the sample 20 to have material properties of the selected composition uniformly applied across the sample 20 body. Further, the sample 20 may be modeled to have length L, width W, and thickness T dimensions.

In some embodiments, a digitized rock sample may be modeled to have a plurality of dispersed inhomogeneous features. For example, a digitized rock sample may be a model of an anisotropic rock having a plurality of distributed anisotropic features (e.g., differently oriented crystalline structures, different compositions, different material properties, or other different microstructure features).

Figure 3:
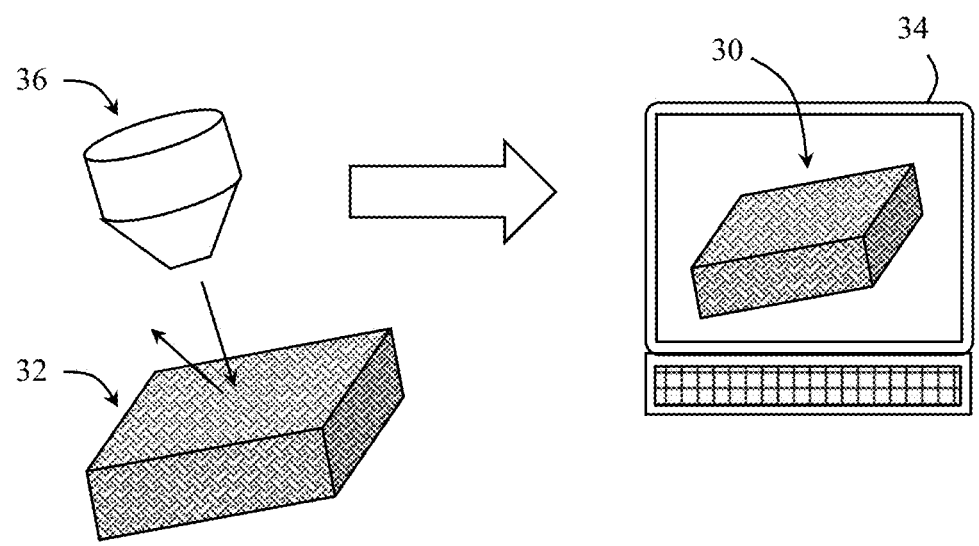
FIG. 3 shows a method of forming a digitized rock sample in accordance with one or more embodiments of the present disclosure.

As shown in FIG. 3, a digitized rock sample 30 may be modeled to replicate a physical rock sample 32 using advanced imaging reconstruction. Advanced imaging reconstruction may include generating images from projected data acquired at many different angles around the physical rock sample to form the digitized rock sample 30 using a computing device 34. For example, at least one type of imaging device 36 may scan one or more surfaces of the physical rock sample 32, where data collected from the scan may be used to reconstruct digital images of the surface(s) of the rock. Based on the scanned surface compositions, different algorithms may be used to predict interior construction of the rock not captured by the scan(s), which may be used to model the entire digitized rock sample 30. For example, an imaging device may be used to scan a physical rock sample 32 having an inhomogeneous microstructure, and from the data received from the scan, the grains of the rock may be simulated to form the digitized rock sample 30. In some embodiments, a digitized rock may be modeled with anisotropic properties, for example, different stiffness (or other material property) in different directions.

An imaging device may be selected from, for example, at least one of a scanning electron microscope (SEM), transmission electron microscopy (TEM), a focused ion beam (FIB), x-ray diffraction (XRD), an electron backscatter diffraction SEM, a scanning probe, atomic force microscopy instruments, light microscopy instruments, energy dispersive spectroscopy, and/or other imaging devices. For example, an electron backscatter diffraction device (EBSD) may be used to characterize the crystallographic structure of a rock sample, including, e.g., information about the microstructure, crystal orientation, phase, and strain in the material. In some embodiments, an XRD device may be used to detect a crystalline (including crystal imperfections) or amorphous structure. SEM devices may be used to study the surface morphology and microstructural aspects near to the surfaces of a physical rock sample.

Figure 4:
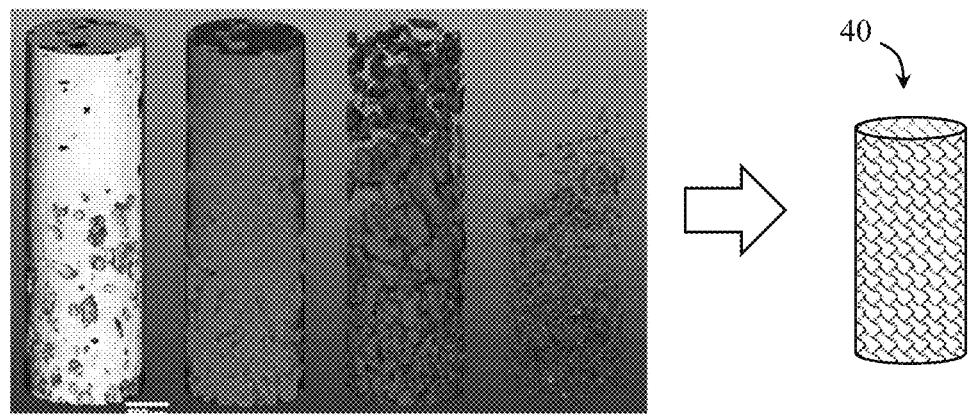
FIG. 4 shows a method of forming a digitized rock sample in accordance with one or more embodiments of the present disclosure.
Figure 5:
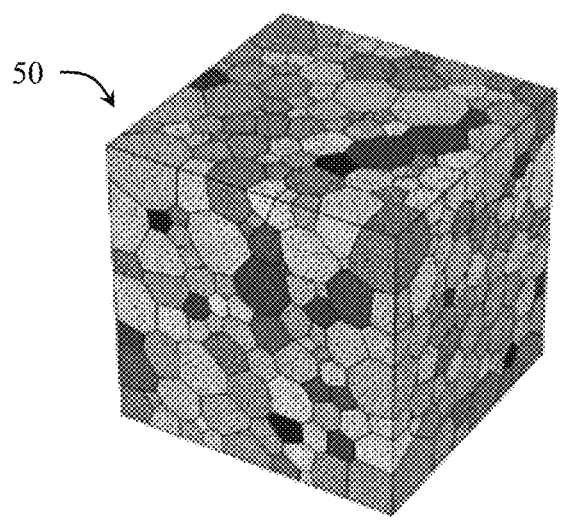
FIG. 5 shows a digitized rock sample in accordance with one or more embodiments of the present disclosure.

FIG. 4 shows another example of modeling a digitized rock sample 40, where a physical rock sample may be scanned, e.g., using x-rays, and a computer imaging program may process data received from the scan to generate the digitized rock sample 40. A computed tomography scan (CT scan) may be used to take measurements (e.g., x-ray measurements) around a physical rock sample to produce different cross-sectional images that may be layered together and processed to generate three dimensional volumes between the layers and form the digitized rock sample. By using such processes, materials forming an interior portion of the rock sample may be detected and simulated in the modeled digitized rock sample 40.

In some embodiments, a physical rock may be modeled by analyzing material properties of elemental sections of the rock and modeling grains and/or different compositions of the rock in the digitized rock sample. For example, in FIG. 5, a digitized rock sample 50 may be modeled using representative volume element, where a unit (e.g., a grain size) of a physical rock sample may be analyzed and simulated to form the digitized rock sample 50. In some embodiments, grains of a digitized rock sample may be simulated using a Voronoi tessellation. In some embodiments, a digitized rock sample may be modeled using Monte Carlo methods used to compute statistical probabilities of different compositional and microstructural outcomes.

Figure 6:
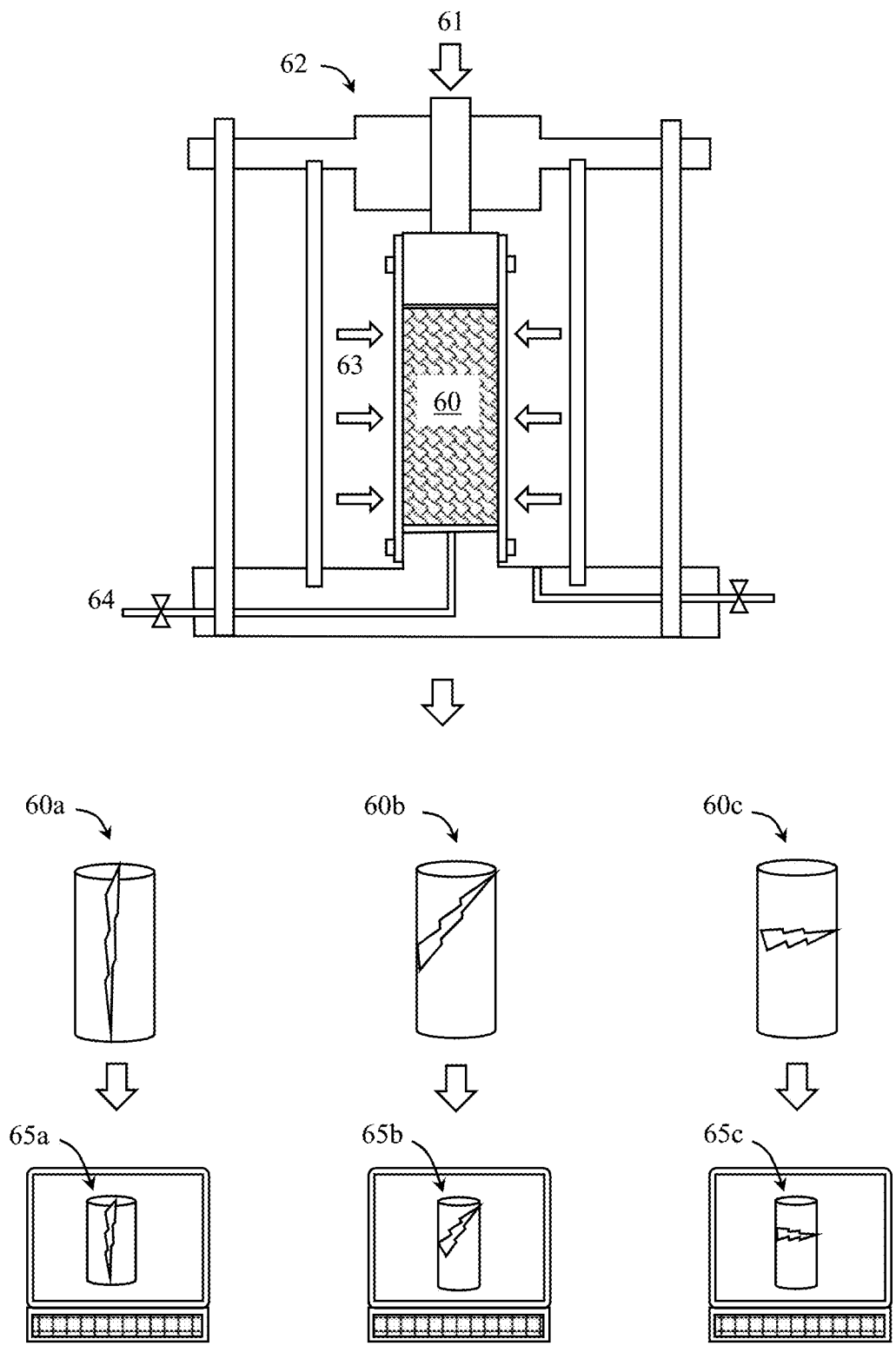
FIG. 6 shows a method of modeling digitized rock samples in accordance with one or more embodiments of the present disclosure.

According to some embodiments of the present disclosure, failure modes observed in physical rock samples may be used to model the physical rock and generate digitized rock samples. For example, as shown in FIG. 6, one or more core samples 60 taken from an underground formation may be tested under a load 61 in a testing apparatus 62. The load 61 may be applied under a confining pressure 63 and temperature conditions that may correspond with formation pressure and temperature in the underground location from which the sample was taken. As the load 61 is applied, pore pressure 64 may be measured in the core sample 60. Tests may be conducted under different confining pressure 63, so that the failure mechanism of the rock sample 60 under different stress triaxiality may be obtained and utilized to model the rock failure mechanism in tension and compression separately. The stress triaxiality may also be obtained to match that of a real application formation so that real downhole cutting element-rock interactions can be simulated.

Different core samples (e.g., core samples of different types of rock or core samples taken along different directions in a formation) may exhibit different failure modes under the same testing conditions. For example, a first core sample 60a may exhibit generally axial fractures, a second core sample 60b may exhibit fractures along diagonal planes through the sample, and a third core sample 60c may exhibit fractures along a radial plane through the sample. From the different failure modes observed in the physical testing, corresponding digitized rock samples 65a, 65b, 65c may be generated to have microstructures, e.g., grain orientations, heterogeneous compositions, anisotropic properties, and crystalline structures, that may produce like failure modes.

Figure 7:
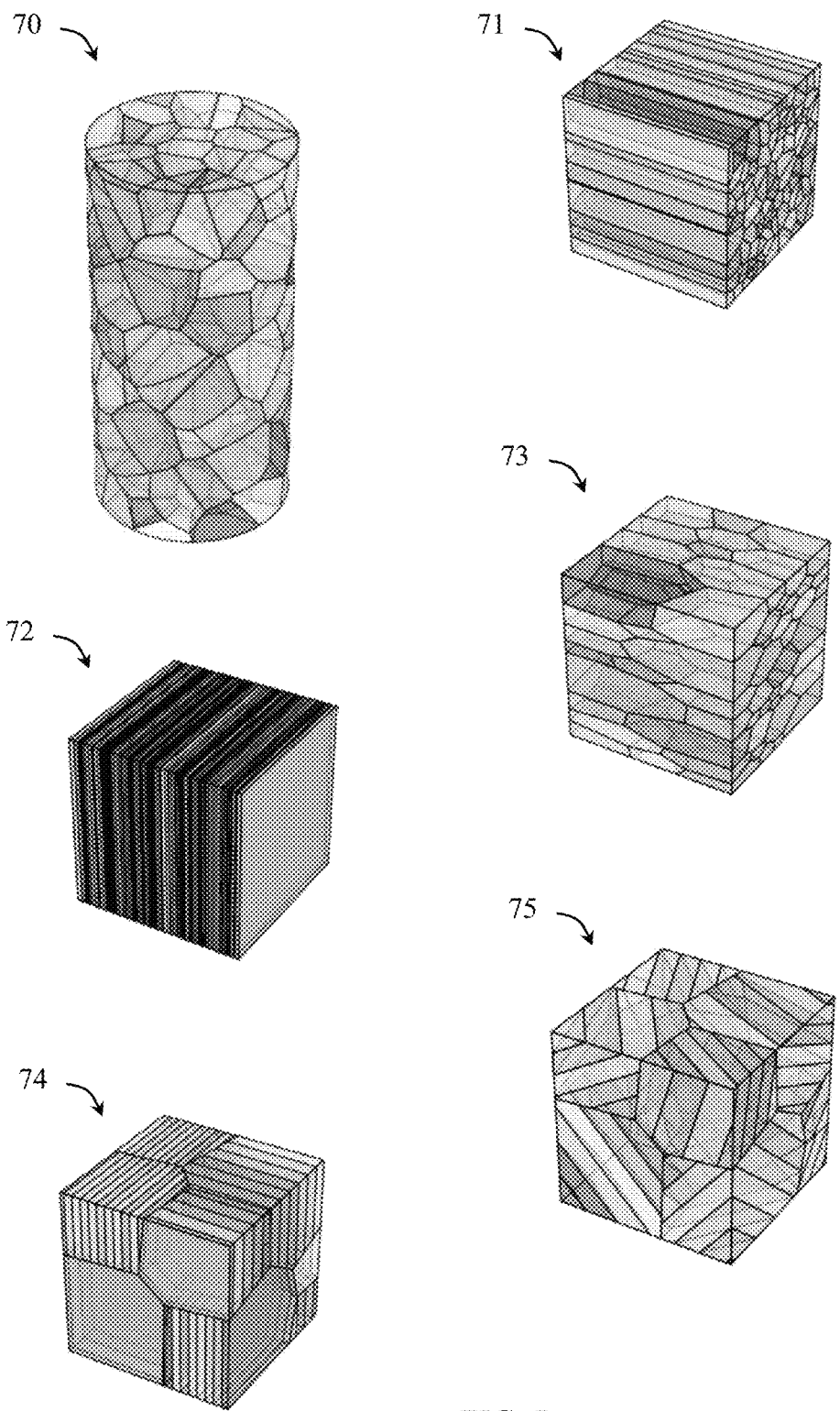
FIG. 7 shows examples of digitized rock samples in accordance with one or more embodiments of the present disclosure.

Different modeling techniques may be used to generate digitized rock samples based on different physical rock samples. For example, FIG. 7 shows examples of different digitized rock samples 70, 71, 72, 73, 74, 75 modeled from different physical rock structures. As shown, digitized rock samples 70-75 may be modeled to have different microstructures and compositions. For example, a digitized rock sample may be modeled to have a layered microstructure (e.g., shown in digitized rock sample 72), linear microstructures (e.g., shown in digitized rock samples 71, 73), randomized microstructures (e.g., shown in digitized rock sample 70), and/or patterned orientations extending in different directions (e.g., shown in digitized rock samples 74, 75). Further, different modeling techniques may be used to generate different digitized rock samples based on the same physical rock sample (e.g., for increased statistical accuracy). As digitized rock samples are generated, they may be stored in a digital rock library, which may be searchable and accessible for use in other simulations and analyses. In some embodiments, the digitized rock samples are utilized with numerical models as discussed below. Additionally, or in the alternative, the digitized rock samples may be utilized with the analytical model to determine cutter forces as described in U.S. application Ser. No. 16/838,649 entitled, "Cutter/Rock Interaction Modeling," which is hereby incorporated by reference in its entirety.

Further, digitized rock samples may be calibrated or updated to more accurately mimic behavior of a physical rock type by collecting measurement data from corresponding physical rock and comparing the physical rock measurement data with corresponding measurement data from the digitized rock sample. For example, a first digitized rock sample may be modeled to simulate limestone. A physical sample of limestone may have one or more properties material tested (e.g., stress tested, or compression tested), where the results of such tests may be compared with the results of a simulated version of the test(s) on the digitized rock sample. If differences are determined between real observations and simulated observations, the digitized rock sample may be calibrated to reflect the real observations.

Figure 8:
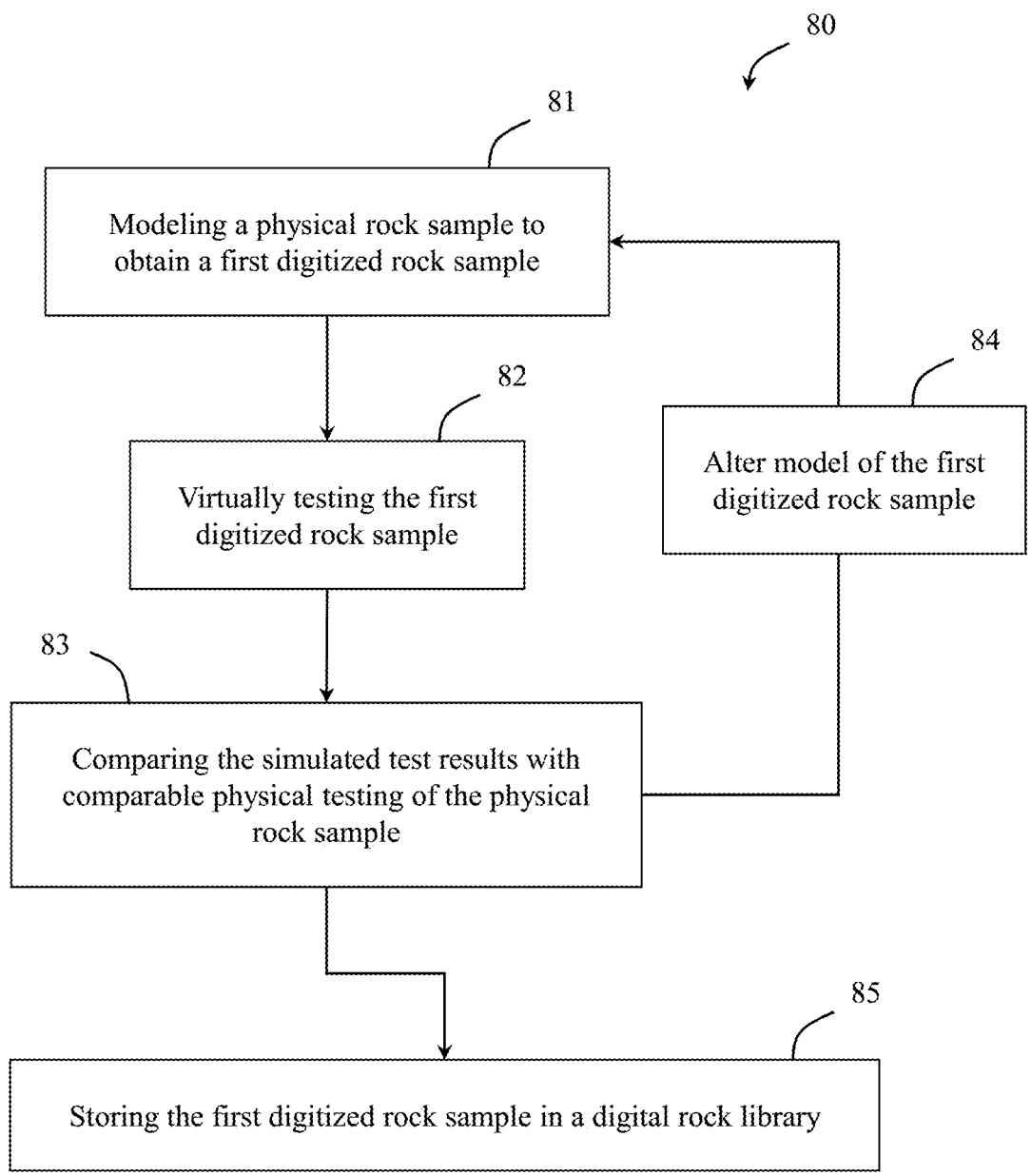
FIG. 8 shows a method in accordance with one or more embodiments of the present disclosure.

For example, FIG. 8 shows an example of a method 80 for forming a digital rock library according to embodiments of the present disclosure. The method 80 may include modeling a rock using a computer modeling program to form a first digitized rock sample 81. For example, a digitized rock sample may be modeled by scanning a real rock using x-ray imaging to determine a crystallographic structure of the real rock and inputting the scan of the crystallographic structure into the computer modeling program. The first digitized rock sample may be stored in a digital rock library 85, which may be accessed for virtual testing.

When the first digitized rock sample has been modeled, one or more materials tests may be simulated on the first digitized rock sample, and the same or comparable materials test may be conducted on a physical sample of the rock. The simulated test results may then be compared with the physical test results. For example, a stress may be simulated on the first digitized rock sample to virtually test the first digitized rock sample and output a simulated failure mode 82. The same stress type may be replicated on a physical sample of the rock until a physical failure occurs in the physical sample, and the physical failure may be compared to the simulated failure mode 83. In some embodiments, physical testing on physical rock samples may be from materials tests conducted in a lab. In some embodiments, real world applications in the field in a formation of the same or comparable rock type as the first digitized rock sample may be analyzed and used as comparable physical testing, where the failure mode(s) and/or material characteristics of the formation may be compared with those of the first digitized rock sample.

When a simulated test result does not match with a comparable physical test result (either from the lab or the field), at least one parameter of the first digitized rock sample may be altered to calibrate, or better correspond, the first digitized rock sample to that of the physical rock sample 84. For example, at least one parameter selected from a material composition or a material property (e.g., hardness, compressive strength, etc.) may be altered in the first digitized rock sample based on the comparison of a physical failure mode in the corresponding physical rock sample to the simulated failure mode in the virtual testing of the first digitized rock sample. The altered first digitized rock sample may be saved in the digital rock library as a second digitized rock sample. In such manner, modeling a digitized rock sample, simulating materials testing on the digitized rock sample, replicating physical testing in a corresponding physical rock sample, comparing the virtual test results to the physical test results, and, when differences are found between the simulated and physical testing, altering at least one parameter in the digitized rock sample may be repeated as desired to provide multiple digitized rock samples in a digital rock library 85.

In some embodiments, virtual testing of a digitized rock sample by analytical models and/or numerical models may substantially correspond (e.g., within a 5 percent margin of error) with physical test results from the same or similar physical rock sample. In such embodiments, the digitized rock sample may be stored in the digital rock library without any modification or calibration. In some embodiments, multiple rock types may be modeled as different digitized rock samples and stored in a digital rock library. According to embodiments of the present disclosure, a digital rock library may include one or more, e.g., more than ten, more than a hundred, more than a thousand, different digitized rock samples.

Virtual Testing and Digital Rock Interaction Files

Digital rock labs disclosed herein may provide a virtual field test platform to virtually test cutting element interaction with rock through simulation of a modeled cutting element interacting with a digitized rock sample. Using such virtual field testing platforms may enable faster and cheaper research and development of the most efficient cutting element types to interact with a selected rock type by simulating interactions between a modeled cutting element and a digitized rock sample rather than building physical cutting elements and physically testing them against purchased or otherwise obtained physical rock samples. In such manner, digital rock labs may be used to quickly test feasibility of different cutting element concepts and evaluate performance when engaging with different types of rock.

To virtually test cutting element interaction with rock, a cutting element may be modeled using a computer simulation and modeling software. A modeled cutting element may be defined having at least one cutting element parameter selected from composition, interface design, cutting edge geometry, cutting face geometry, size, and overall shape. For example, to determine an optimized cutting face geometry for cutting a selected rock type, modeled cutting elements having different proposed cutting face geometries may be generated for virtually testing with digitized rock samples of the selected rock type.

Digital rock labs according to embodiments of the present disclosure may include a finite element analysis (FEA) based virtual testing platform to simulate at least one modeled cutting element cutting at least one digitized rock sample. Briefly, FEA is a computerized method for predicting how an object may react to real-world forces, vibration, heat, fluid flow, and other physical effects, and thus may show whether the object will break, wear out, or work the way it was designed. FEA involves dividing a body under study into a finite number of pieces (subdomains) called elements (e.g., division into small cubes or other geometric pieces). Assumptions may then be made on the variation of the unknown dependent variable(s) across each element using so-called interpolation or approximation functions. This approximated variation may be quantified in terms of solution values at element locations called nodes. Through this discretization process, the method sets up an algebraic system of equations for unknown nodal values which approximate the continuous solution. Because element size, shape and approximating scheme can be varied to suit the problem, the method can accurately simulate solutions to problems of complex geometry and loading. Numerical models, such as FEA, may be more suitable and efficient to model the interactions of a non-planar cutting element with a formation than an analytical model. However, analytical models, like what is described in U.S. application Ser. No. 16/838,649, may be effective to model the interaction of a planar cutting element with a formation.

In one or more embodiments, FEA simulation programs may provide visual outputs of cutting element parameters and/or rock interaction parameters. Further, the outputs may include tabular data or may be in the form of graphs, charts, and/or logs, of a parameter, for example. Other plots may include presentation or visualization of the results at a minimum or maximum value, or any combination of those results. A graphical visualization (e.g., 2-D, 3-D, or 4-D) of the modeled cutting element interacting with a digitized rock sample may also be output. In some embodiments, a graphical visualization may include a color scheme used to map stress values along the modeled cutting element.

Outputs from simulations of modeled cutting elements engaging digitized rock samples may include, for example, reaction forces (e.g., vertical forces, lateral forces, shear forces, etc.) between the digitized rock sample and the modeled cutting element at a depth of cut and an orientation (e.g., back rake and/or side rake), stress values in the modeled cutting element, and failure modes of the modeled cutting element and/or digitized rock sample.

According to embodiments of the present disclosure, outputs from a simulation of a modeled cutting element engaging a digitized rock sample may be stored in digital rock interaction files. The outputs and parameters of the digitized rock sample of a simulation may be stored as a text file in the digital rock interaction file corresponding to the simulated interaction between the modeled cutting element and digitized rock sample.

In some embodiments, digital rock interaction files may be processed into an expanded data set of digital rock interaction files. For example, digital rock interaction files for a particular cutter shape based on a physical test of the cutting element shape under base parameters (e.g., cutter orientation, depth of cut, confining pressure, rock type) may be expanded to generate modeled digital rock interaction files for the cutting shape with at modified base parameters. A cutter/rock interaction modeling system 210 may utilize numerical models (e.g., FEA) with modified base parameters to generate expanded sets of digital rock interaction files. Statistical analysis may be determined to evaluate the quality of the expanded digital rock interaction files. Digital rock interaction files generated from subsequent physical tests of the cutting element shape may be compared with prior determined expanded digital rock interaction files. The statistical analysis and subsequent physical tests may be used to calibrate the numerical models used to generate the expanded set of digital rock interaction files, thereby further training the numerical model. Accordingly, the digital rock interaction files may be expanded and extrapolated such that reaction forces, stress values in the modeled cutting element, and failure modes of the cutting element and digitized rock sample may be determined for additional base parameters without actual performance of the corresponding tests.

After test data for digital rock interaction files for the same digitized rock sample have been expanded, a cutter/rock interaction modeling system 210 may also aggregate the multiple sets of expanded digital rock interaction files to train a neural network model for the digitized rock sample. That is to say, the cutter/rock interaction modeling system 210 may perform a machine learning process in which the multiple sets of expanded digital rock interaction files may be used as training data. The machine learning process may involve aggregating the multiple sets of expanded digital rock interaction files to form training data used to train a neural network model. The aggregated sets of expanded digital rock interaction files may be used to evaluate other cutting element shapes with the digitized rock sample.

The outputs stored in digital rock interaction files may be read into other design programs and methods to use in cutting element application design. For example, when simulating a bit drilling through a selected rock type, digital rock interaction files generated from simulations with digitized rock samples of the same selected type of rock may be queried to find and select the most efficient types of cutting elements to use on the bit. As another example, when simulating a bit having a selected cutting element type drilling through a selected rock type, digital rock interaction files generated from simulations between modeled cutting elements of the selected type and digitized rock samples of the selected type of rock may be inputted directly into the drilling simulation to efficiently and more accurately simulate the bit performance in drilling the selected rock type.

Figure 9:
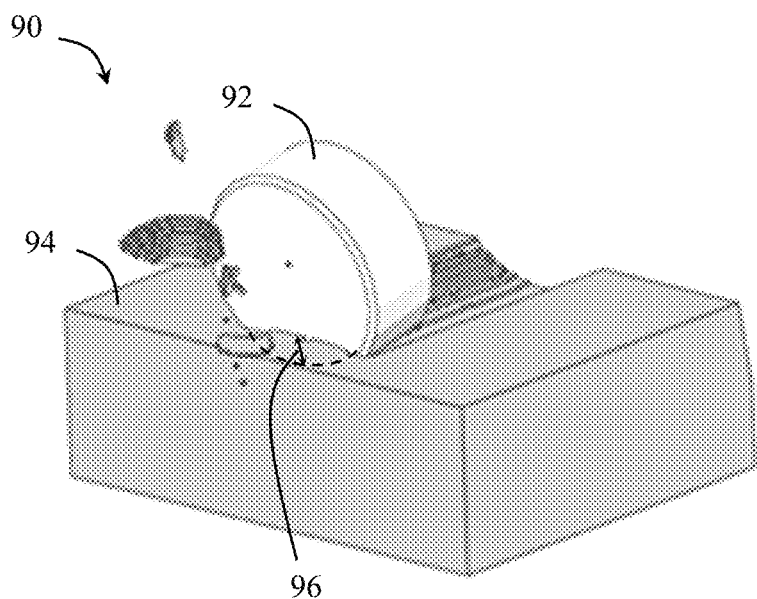
FIG. 9 shows a virtual test in accordance with one or more embodiments of the present disclosure.

FIG. 9 shows an example of a virtual test 90 of a modeled cutting element 92 cutting a digitized rock sample 94. The modeled cutting element 92 may be simulated as cutting the digitized rock sample 94 at one or more depths of cut 96, at one or more back rakes, at one or more side rakes, and/or other interaction parameters. Further, the virtual test 90 may be replicated with different digitized rock samples 94. For example, the modeled cutting element 92 may be simulated as cutting a first digitized rock sample having a first composition under a first set of interaction parameters, and the results of the simulation may be stored in a first digital rock interaction file. The same modeled cutting element 92 may be simulated as cutting a second digitized rock sample having a second composition (different from the first composition) under the same first set of interaction parameters, and the results of the simulation may be stored in a second digital rock interaction file.

Figure 10:
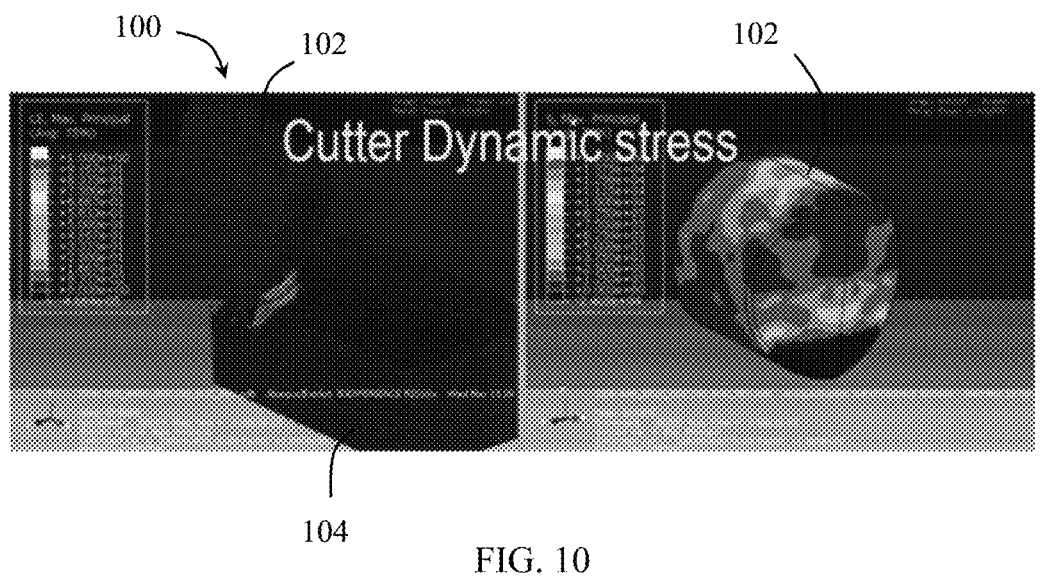
FIG. 10 shows examples of virtual testing in accordance with one or more embodiments of the present disclosure.

Virtual testing may also be used to model cutting element dynamic stress. For example, FIG. 10 shows an example of a virtual test 100 of a modeled cutting element 102 cutting a digitized rock sample 104. Stresses acting on the cutting element 102 as it cuts through the digitized rock sample 104 may be determined from the simulation and mapped onto the modeled cutting element 102 (e.g., similar to a color-coded heat map) and/or otherwise recorded in text format (e.g., a maximum stress, minimum stress, etc.).

Figure 11:
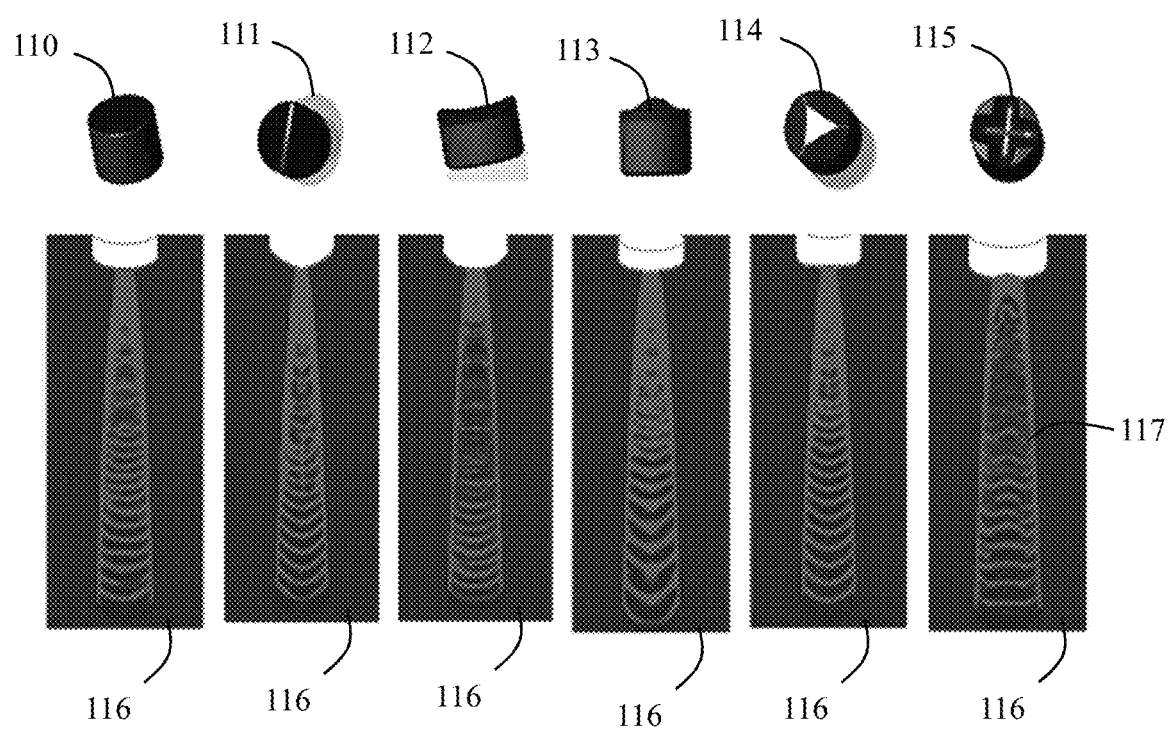
FIG. 11 shows examples of virtual testing in accordance with one or more embodiments of the present disclosure.

In some embodiments, virtual testing may be used to test how different cutting elements cut a rock type modeled as a digitized rock sample. For example, FIG. 11 shows an example of virtual testing outputs from simulations of multiple different modeled cutting elements 110, 111, 112, 113, 114, 115 each cutting a digitized rock sample 116. Each modeled cutting element 110, 111, 112, 113, 114, 115 may be modeled as having a cutting face (e.g., an upper surface of the cutting element that typically is arranged to face in the direction of cut and contact the rock being cut) with different geometries. For example, a first cutting element 110 may be modeled as having a planar cutting face and a generally cylindrical body. A second cutting element 111 may be modeled as having a non-planar cutting face with a ridge extending linearly across the cutting face. A third cutting element 112 may be modeled as having a non-planar cutting face with a scoop (concave region) taken along a central portion of the cutting face. A fourth cutting element 113 and fifth cutting element 114 may be modeled as having non-planar cutting faces with different centrally protruding geometries (e.g., a dome and a truncated triangular prism, respectively). A sixth cutting element 115 may be modeled as having a non-planar cutting face with multiple intersecting linear ridges extending across the diameter of the cutting face. According to embodiments of the present disclosure, cutting elements may be modeled as having an ultrahard material table (e.g., diamond, polycrystalline diamond, thermally stable polycrystalline diamond, cubic boron nitride, or composite blend) disposed on a substrate (e.g., a transition metal carbide substrate such as tungsten carbide). Cutting elements may be modeled as having a planar or non-planar cutting face formed on an opposite side of the ultrahard material table from the substrate. Further, cutting elements may be modeled as having a planar or non-planar interface between an ultrahard material table and substrate.

Depending on the design of the cutting element (e.g., the geometry of the cutting face that contacts the rock, the design of the cutting edge bordering the cutting face, the material composition of the cutting element, and/or the interface geometry between an ultrahard layer and substrate), the cutting action of the cutting element 110, 111, 112, 113, 114, 115 against the digitized rock sample 116 may be different, as shown by the different damage patterns 117 in the digitized rock samples 116. In such manner, the virtual testing may provide a visual of chip formation from the digitized rock sample 116 as it is being cut by the cutting element.

Figure 12:
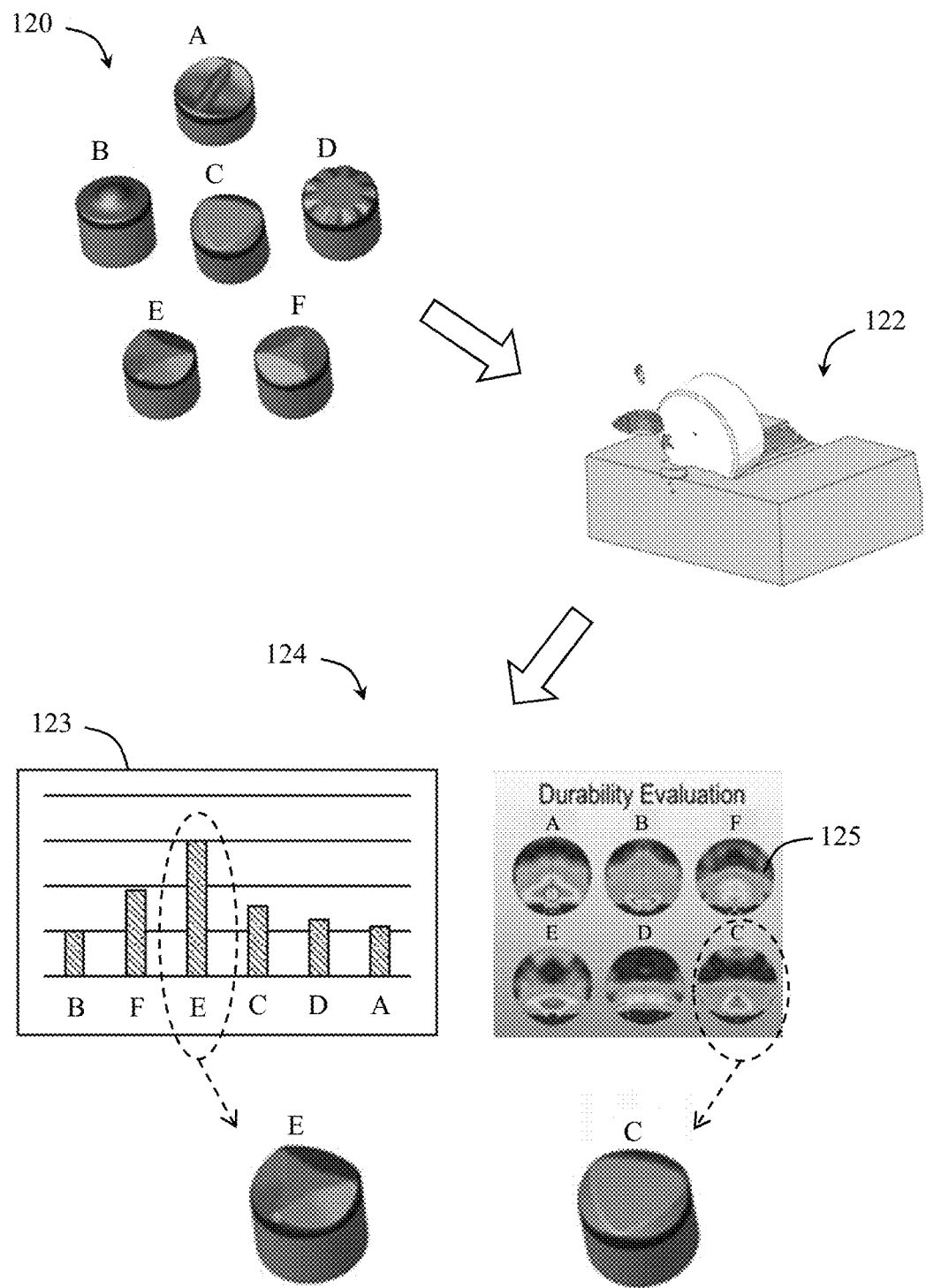
FIG. 12 shows a method in accordance with one or more embodiments of the present disclosure.

According to embodiments of the present disclosure, digital rock labs may utilize virtual testing of cutting element performance with different types of digitized rock samples to shorten the research and development timeline in drilling design. For example, FIG. 12 shows a method of virtually testing cutting element performance using a digital rock lab according to embodiments of the present disclosure. The method may include proposing at least one cutting element design (e.g., having cutting face geometries with shapes A, B, C, D, E, and F) and modeling the proposed cutting elements using a computer simulation and modeling program 120. The cutting element designs proposals may be based on one or more needs of a project, for example, the application in which the cutting element is to be used.

Each of the proposed modeled cutting elements may be virtually tested in the digital rock lab by simulating, such as with numerical models, the cutting elements engaging with one or more digitized rock samples 122. The digitized rock samples may be obtained from a digital rock library (where the digitized rock sample(s) may be selected from one or more digitized rock samples already generated and stored in the digital rock library), and/or the digitized rock sample(s) may be generated for a particular cutting element performance analysis at the time of testing, which may later be stored in a digital rock library. During simulating 122 cutting elements cutting a digitized rock sample, one or more rock interaction parameters (e.g., rock cutting efficiency, accumulated stress in the cutting elements, reaction forces between the digitized rock sample and cutting element, etc.) may be measured and saved in a digital rock interaction file.

The rock interaction data from the simulations of each of the proposed modeled cutting elements may be evaluated and compared 124. From the evaluation and comparison of the rock interaction data, a proposed cutting element may be selected for further development and/or use in an application. Depending on a proposed end use of the cutting element, a proposed cutting element design may be selected based on one or more types of rock interaction data relevant to optimized performance in the proposed end use of the cutting element. For example, as shown, a proposed cutting element design may be selected from the proposed cutting element designs having the highest cutting efficiency 123 during simulation of cutting one or more digitized rock samples (e.g., based on the highest average cutting efficiency). As another example, a proposed cutting element design may be selected from the proposed cutting element designs having the greatest durability, e.g., as determined from measured amounts of dynamic stress 125 during simulation of cutting one or more digitized rock samples.

Figure 13:
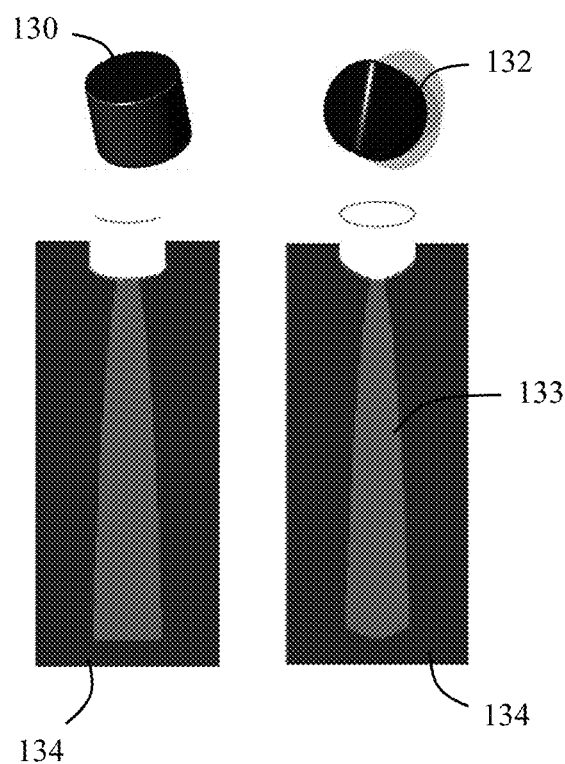
FIGS. 13-15 show examples of virtual testing results in accordance with one or more embodiments of the present disclosure.
Figure 14:
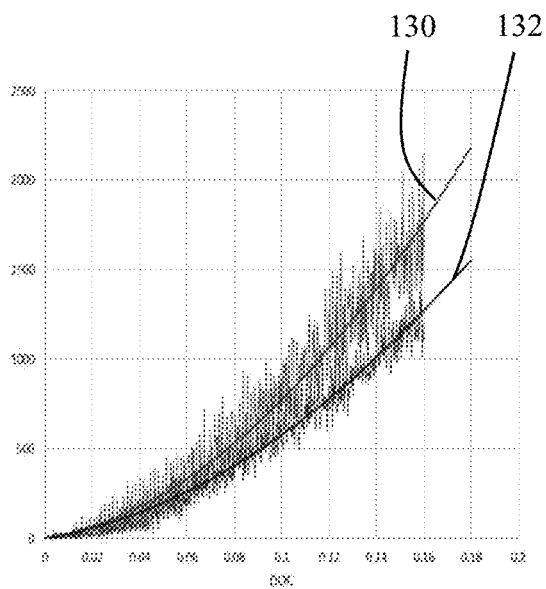
Figure 15:
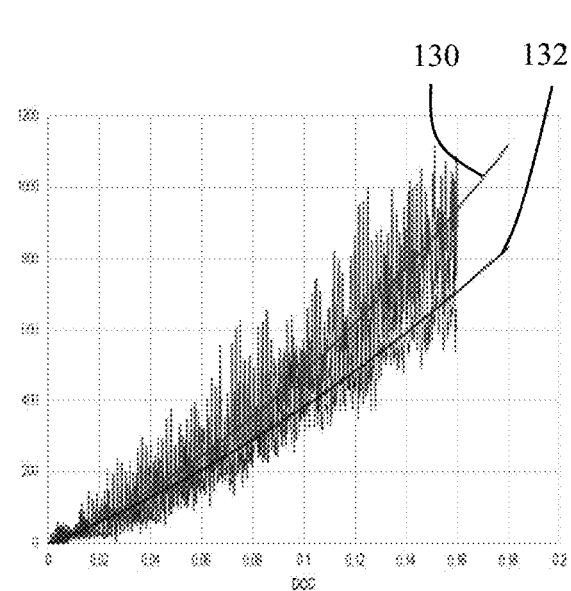

Another example of a research and development process utilizing virtual testing, as described herein, is shown in FIGS. 13-15, where performance of a first modeled cutting element 130 having a planar cutting face may be compared with performance of a second modeled cutting element 132 having a non-planar cutting face in different types of rock, including a first digitized rock sample 134 of a relatively harder, brittle rock, and a second digitized rock sample 136 of a relatively softer, brittle-ductile rock.

As shown in FIG. 13, when the first modeled cutting element 130 and second modeled cutting element 132 are simulated as cutting the first digitized rock sample 134, the damage patterns 133 from the two modeled cutting elements 130, 132 may be compared to visually determine which cutting element cuts more of the first digitized rock sample 134 under the same loading conditions. Additionally, as the cutting elements 130, 132 are simulated cutting the first digitized rock sample 134, the cutting forces (shown in FIG. 14) and the vertical forces (shown in FIG. 15) of the cutting elements 130, 132 may be measured and plotted for different depths of cut (DOC). As shown in FIGS. 14 and 15, the cutting and vertical forces of the first cutting element 130 are higher than the second cutting element 132, which may indicate better cutting efficiency of the second cutting element 132 when cutting the first digitized rock sample 134. The results of the simulation may be stored in digital rock interaction files, e.g., a first digital rock interaction file for the first modeled cutting element 130 cutting the first digitized rock sample 134 and a second digital rock interaction file for the second modeled cutting element cutting the first digitized rock sample 134.

As shown in FIG. 16, the first modeled cutting element 130 and second modeled cutting element 132 may be simulated as cutting the second digitized rock sample 136, where the second digitized rock sample 136 may model a rock type that is softer and more ductile than the first digitized rock sample 134. The damage patterns 133 from the two modeled cutting elements 130, 132 may be compared to visually determine which cutting element cuts more of the second digitized rock sample 136 under the same loading conditions. Additionally, as the cutting elements 130, 132 are simulated cutting the second digitized rock sample 136, the cutting forces (shown in FIG. 17) and the vertical forces (shown in FIG. 18) of the cutting elements 130, 132 may be measured and plotted for different depths of cut (DOC). As shown in FIGS. 17 and 18, the cutting and vertical forces of the first and second cutting elements 130, 132 are close, which may indicate the first and second cutting elements 130, 132 have similar cutting efficiency when cutting the second digitized rock sample 136. The results of the simulation may be stored in different digital rock interaction files, e.g., a third digital rock interaction file for the first modeled cutting element 130 cutting the second digitized rock sample 136 and a fourth digital rock interaction file for the second modeled cutting element 132 cutting the second digitized rock sample 136.

By performing the virtual tests of the two different cutting elements cutting different digitized rock samples, a tester may quickly determine which cutting element performs better when cutting each type of rock. For example, instead of purchasing or otherwise acquiring multiple physical testing rocks and forming multiple physical testing cutting elements to determine optimal cutting element selection for a rock type, different modeled cutting elements may quickly be interchanged and tested on different types of rock. According to embodiments of the present disclosure, more than two different cutting elements may be virtually tested as cutting a digitized rock sample to generate multiple digital rock interaction files (e.g., a digital rock interaction file for each cutting element simulated as cutting the digitized rock sample). Further, a single cutting element design may be virtually tested as cutting multiple different digitized rock samples to generate multiple digital rock interaction files (e.g., a digital rock interaction file for each digitized rock sample that is simulated as being cut with the cutting element).

According to embodiments of the present disclosure, the outputs (including performance data, such as reaction forces between the cutting element and digitized rock sample) from different virtual tests may be stored in digital rock interaction files, where additional digital rock interaction files may be added to the collection as additional virtual tests are conducted. In some embodiments, the digital rock interaction files may be physically-generated digital rock interaction files that are generated through digitization of direct physical tests of cutting elements with rock samples under calibrated base parameters. In some embodiments, the digital rock interaction files may be physically-generated digital rock interaction files, expansion of physically-generated digital rock interaction files through a machine learning process, numerical model-generated digital rock interaction files that are expanded from other digital rock interaction files, or any combination thereof. In some embodiments, the origin of the digital rock interaction files may be identified and stored with the digital rock interaction file. For example, a digital rock interaction file may be identified as being directly based on a physical test or expanded through a machine learning process from another digital rock interaction file. The origin of a digital rock interaction file may be used to assign a weight when training the numerical models used to generate the digital rock interaction files. The machine learning process to expand one or more digital rock interaction files may be the process to expand test data for cutter/rock pairs described in U.S. application Ser. No. 16/838,649, which is incorporated by reference herein. Larger collections of digital rock interaction files may allow for faster and/or more robust simulations at the application level, e.g., simulating a bit, reamer, or other boring tool having one or more of the tested cutting elements drilling a formation modeled by one or more digitized rock samples. Digital rock interaction files may be stored in computer memory devices or in the cloud. Further, digital rock interaction files may be stored in the same or different location as the digital rock library, where both the digital rock interaction files and the digital rock library may be accessed through a digital rock lab computing program including one or more computer simulation and modeling programs.

Application Design

According to embodiments of the present disclosure, data from a digital rock lab may be used for designing drilling equipment (e.g., a reamer, a drill bit and/or other components in a bottom hole assembly (BHA)) and/or a well plan. For example, a method for designing a drill bit may include simulating a cutting element cutting a digitized rock sample in a digital rock lab and storing outputs from the simulating in digital rock interaction file(s). A drill bit may then be modeled to have at least one of the cutting elements that was simulated in the digital rock lab to provide the digital rock interaction file(s), and data from the digital rock interaction file(s) may be inputted into a drilling simulation program to simulate the drill bit in a drilling operation. By inputting data from the digital rock interaction file(s) into the drilling simulation program, the drilling simulation may have access to and quickly use interaction data between cutting elements and the formation that was pre-generated in the digital rock lab.

As used herein, a "drilling simulation" may refer to a dynamic simulation of a cutting tool (e.g., a drill bit or BHA) used in a drilling operation. The drilling simulation may be referred to as being "dynamic" when the drilling is a "transient time simulation," meaning that it is based on time or the incremental rotation of the drilling tool assembly. Methods for such simulations are disclosed in, for example, U.S. Pat. Nos. 6,516,293, 6,873,947, 7,844,426, 7,139,689, 6,785,641, 8,401,831, and 7,464,013 as well as U.S. patent application Ser. Nos. 10/749,019, 10/852,574, 10/851,677, 10/888,358, and 10/888,446, all of which are incorporated by reference in their entirety.

Figure 19:
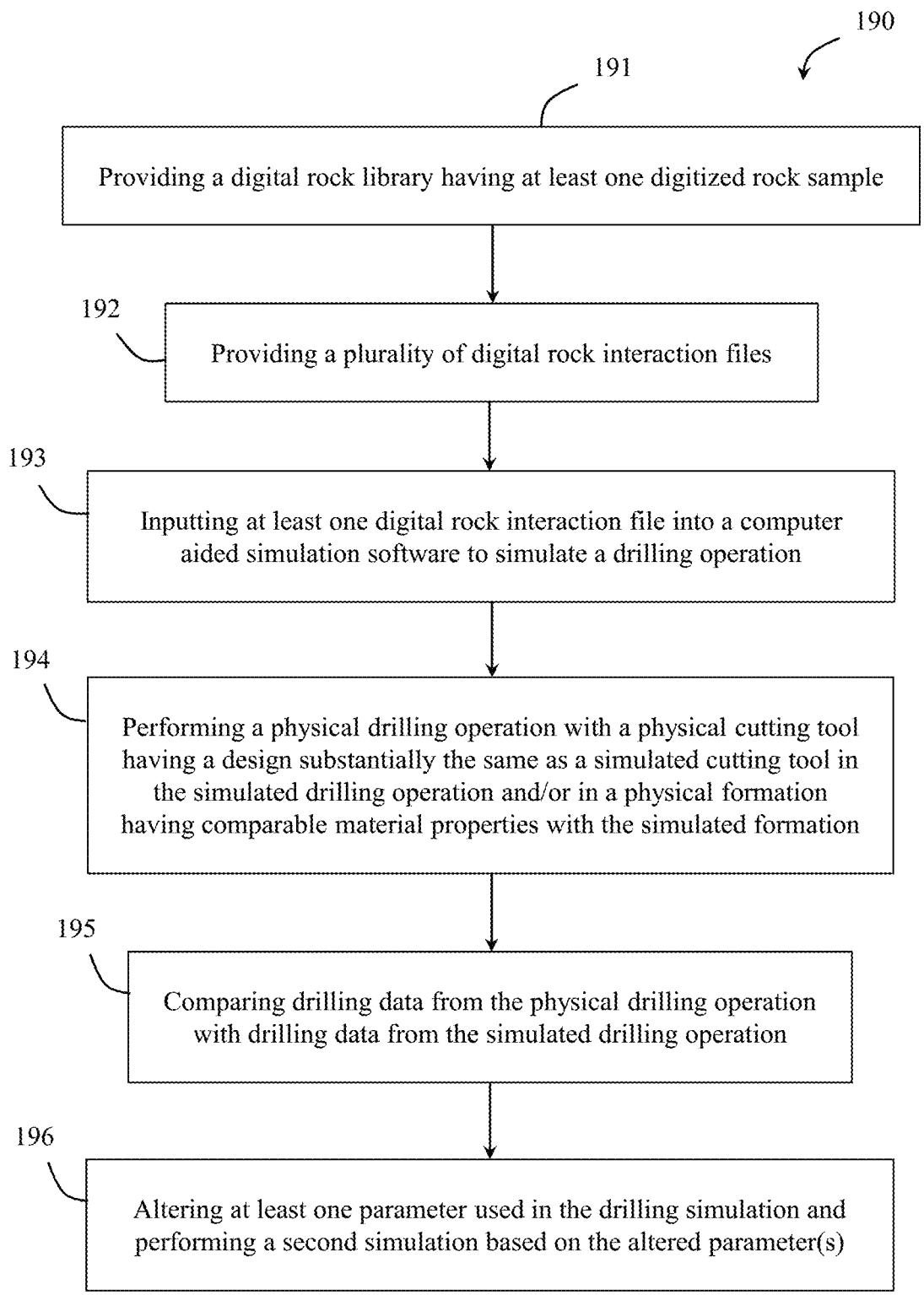
FIG. 19 shows a method in accordance with one or more embodiments of the present disclosure.

FIG. 19 shows an example of a method according to embodiments of the present disclosure that may be used for designing drilling equipment and/or a well plan. In one or more embodiments, one or more of the steps shown in FIG. 19 may be omitted, repeated, and/or substituted. Accordingly, embodiments of designing drilling equipment and/or planning a well should not be considered limited to the specific arrangements of modules shown in FIG. 19.

As shown in FIG. 19, the method 190 may include providing a digital rock library having a plurality of digitized rock samples 191. As described above, digitized rock samples in a digital rock library may include models of rocks having different compositions. Further, digitized rock samples in a digital rock library may be generated to replicate rock found in a formation of interest in a well plan. A plurality of digital rock interaction files may also be provided 192, e.g., from a digital rock lab. As described above, digital rock interaction files may include reaction forces and other performance data generated from simulations of at least one cutting element cutting at least one of the digitized rock samples. At least one of the digital rock interaction files may be inputted into a computer aided simulation software to simulate a drilling operation 193. For example, a drill bit may be modeled as having at least one cutting element used to generate the inputted digital rock interaction file(s), and the modeled drill bit may be simulated as drilling a formation having rock represented by at least one of the digitized rock samples.

A physical drilling operation may be performed (either before, during or after simulating a drilling operation) using a physical cutting tool having a design substantially the same as a simulated cutting tool in the simulated drilling operation and/or in a physical formation having comparable material properties with the simulated formation 194. For example, a physical drill bit having a design substantially the same as the drill bit model in the simulated drilling may be used to drill a physical formation having the same rock type as was simulated in the drilling simulation. During physical drilling operations, field data or drilling data including at least one of rock interaction data, wellbore parameters, drilling equipment performance, and fluid properties within the well may be collected from the physical drilling operation.

"Wellbore parameters" may include one or more of the geometry of a wellbore and formation material properties (i.e. geologic characteristics). The trajectory of a wellbore in which the drilling tool assembly is to be confined may be defined along with an initial wellbore bottom surface geometry. Because the wellbore trajectory may be straight, curved, or a combination of straight and curved sections, wellbore trajectories, in general, may be defined by defining parameters for each segment of the trajectory. For example, a wellbore may be defined as comprising N segments characterized by the length, diameter, inclination angle, and azimuth direction of each segment and an indication of the order of the segments (i.e., first, second, etc.). Wellbore parameters defined in this manner can then be used to mathematically produce a model of the entire wellbore trajectory. Formation material properties at various depths along the wellbore may also be defined and used. One of ordinary skill in the art will appreciate that wellbore parameters may include additional properties, such as friction of the walls of the wellbore, casing and cement properties, and wellbore fluid properties, among others, without departing from the scope of the disclosure.

Drilling data from the physical drilling operation may be collected and compared with drilling data from the simulated drilling 195. Based on the comparison between drilling data collected from a physical drilling operation to a simulated drilling operation, at least one parameter used in the drilling simulation may be altered to calibrate the drilling simulation to more closely match the physical drilling 196. Additional drilling simulations may be performed using at least one altered parameter to achieve a more accurate simulation of real, physical drilling.

For example, rock interaction data from a physical drilling operation may be compared to simulated rock interaction data from a drilling simulation. The rock interaction data from the physical drilling operation may be used to calibrate a simulation of a cutting element (modeled from one used in the physical drilling operation) cutting a digitized rock sample of rock in the physical formation.

In some embodiments, at least one design parameter of the modeled cutting tool (e.g., drill bit) in a drilling simulation may be altered based on field data collected from the physical drilling operation. The altered cutting tool model may then be simulated in the drilling operation as an updated or calibrated drilling simulation. For example, a simulated drilling operation may be compared with a physical drilling operation, both using a drill bit to drill a formation. When a difference is detected in at least one parameter between the physical drilling operation and the simulated drilling, at least one input into the simulation program may be altered to update the simulated drilling to replicate the at least one parameter corresponding to the physical drilling operation.

In some embodiments, field data collected from a physical formation may provide formation material data of the formation that is different from digitized rock samples in the digital rock library. For example, collected field data relevant to formation characteristics may include at least one of a type of rock, rock strength, rock porosity, pressure, and temperature. Field data from a formation may be obtained, for example, from coring operations, logging operations, and/or from cuttings brought to the surface of a well by returning drilling fluid during drilling. When rock samples from the field are analyzed, either downhole or above-hole, the rock samples may be analyzed to determine one or more properties of the rock, such as the type of the rock (e.g., sedimentary rocks, such as clastics, carbonates, and evaporites, metamorphic rocks, or igneous rock types), rock strength, including unconfined and confined compressive strength, rock porosity, and other known properties of rocks. Additional field data from the formation may be collected that may be used in characterizing the well and/or formation, such as downhole pressure and temperature, and reservoir fluid properties.

Based on formation field data, a new digitized rock sample may be generated to model rock found in the formation. One or more simulations of modeled cutting elements cutting the new digitized rock sample may be performed, and the outputs from such simulation(s) may be stored in new digital rock interaction file(s). The new digital rock interaction file(s) may then be used in a subsequent drilling simulation.

In some embodiments, methods disclosed herein may be used to plan a well. For example, collected formation data from a physical formation may be used to map a well, and drilling simulations using data from at least one rock interaction data file as disclosed herein may be used to plan an optimized well path and/or drilling operation through the formation. Further, in some embodiments, field data from a formation may be continuously collected and used to calibrate simulations involving the formation (e.g., to update formation material data).

Figure 20:
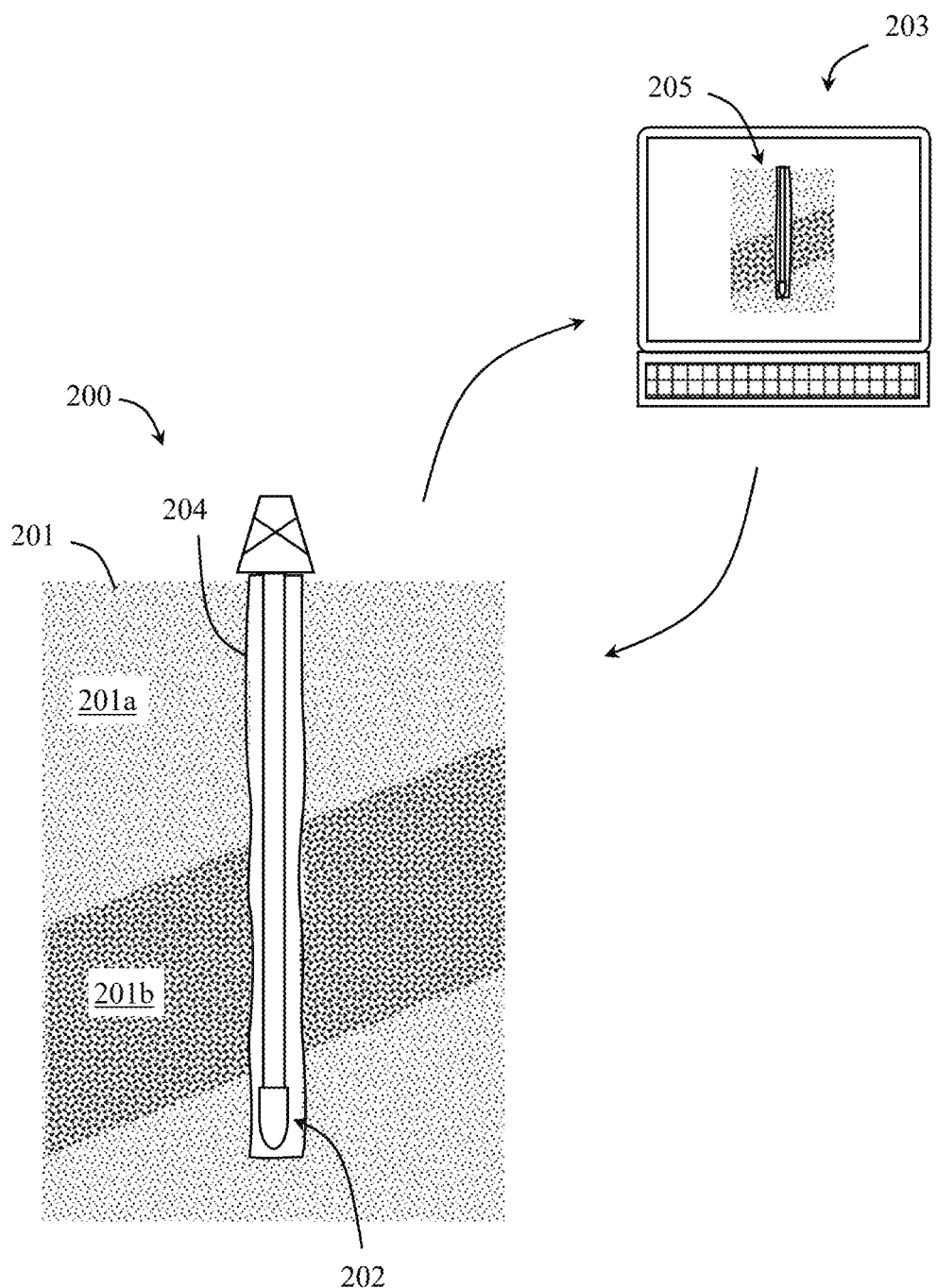
FIG. 20 shows a system in accordance with one or more embodiments of the present disclosure.

FIG. 20 shows an example of a system 200 according to embodiments of the present disclosure that may use field data from a real, physical formation to calibrate formation material data used in simulations for well planning. As shown, the system 200 may include a formation 201 and a tool system 202 that may collect field data from the formation 201. In the embodiment shown, the tool system 202 may include a drill string having a BHA at an end to drill a wellbore 204 into the formation 201, where formation cuttings from drilling may be brought to the surface of the well and used as physical rock samples of the formation 201. In other embodiments, a coring tool, a measurement tool, or other tool types may be used to retrieve field data from the formation 201, either via physical rock samples of the formation or as measurements from the formation 201. Various survey tools and/or data acquisition tools may be adapted to measure the wellbore 204 and/or the formation 201 and detect the characteristics of the wellbore 204 and/or the geological structures of the formation 201.

Physical rock samples of the formation may be analyzed to identify at least one rock type (e.g., 201a, 201b) in the formation 201. Further, the physical rock samples may be correlated with a depth in the formation, which may be used to map rock types through the formation 201.

According to embodiments of the present disclosure, field data, including formation material data gathered from the formation 201, may be inputted into a computing system 203. The computing system 203 may include a computer that is the same as a computer used to perform one or more simulations as described herein, or may include a computer that is different from, but in communication with (e.g., over a network) a computer used to perform one or more simulations as described herein. For example, the computing system 203 may include a digital rock library stored on a memory device and including a plurality of digitized rock samples. Formation material data gathered from the formation 201 may be compared with the digitized rock samples in the digital rock library, and if differences are found in material properties between the physical formation and the digitized rock samples, new digitized rock samples may be generated to model at least one rock type found in the formation 201. A computer aided simulation software, which may be run in the computing system 203, may be used to model a map of the formation, including the locations of at least one rock type (e.g., 201*a*, 201*b*) in the formation 201.

In some embodiments, field data gathered from the formation 201 may be used to generate one or more digitized rock samples modeling rock in the formation 201. One or more modeled cutting elements may be simulated as cutting the digitized rock samples in a digital rock lab, which may be provided by the computing system 203. Reaction forces and other interaction data between modeled cutting element(s) and digitized rock sample(s) may be stored in digital rock interaction files, e.g., on a memory device in the computing system 203 or in the cloud.

As described above, digital rock interaction file(s) may be used in a drilling simulation. For example, the computing system 203 in FIG. 20 may access one or more of digital rock interaction file(s) involving digitized rock samples modeling rock of the formation 201 and use such digital rock interaction file(s) to simulate 205 a drill bit drilling the formation 201. The drilling simulation 205 may include use of a modeled drill bit having the same design as used in the physical BHA drilling the physical formation 201. In some embodiments, the drilling simulation 205 may include use of a modeled drill bit having a different design than one being used to physically drill the formation 201.

A drilling simulation may generate one or more wellbore parameters including, but not limited to, wall quality, effective diameter, spiraling, ledging, tortuosity, bit path and/or movement, borehole diameter, well profile, well trajectory, well center position, and/or visualizations of a borehole in 2D and/or 3D. The simulated wellbore parameters may be compared with wellbore parameters from a physical drilling operation and/or used to optimize a physical drilling operation. In such manner, a cycle of simulated drilling and physical drilling may be performed to optimize a drilling operation through the formation 201.

Computer Simulation and Modeling Programs

Embodiments disclosed herein may be implemented on one or more computing systems. For example, methods and systems of the present disclosure may include accessing one or more elements of a digital rock lab from one or more computing systems and performing one or more virtual tests in the digital rock lab using one of the computing systems.

Figure 21:
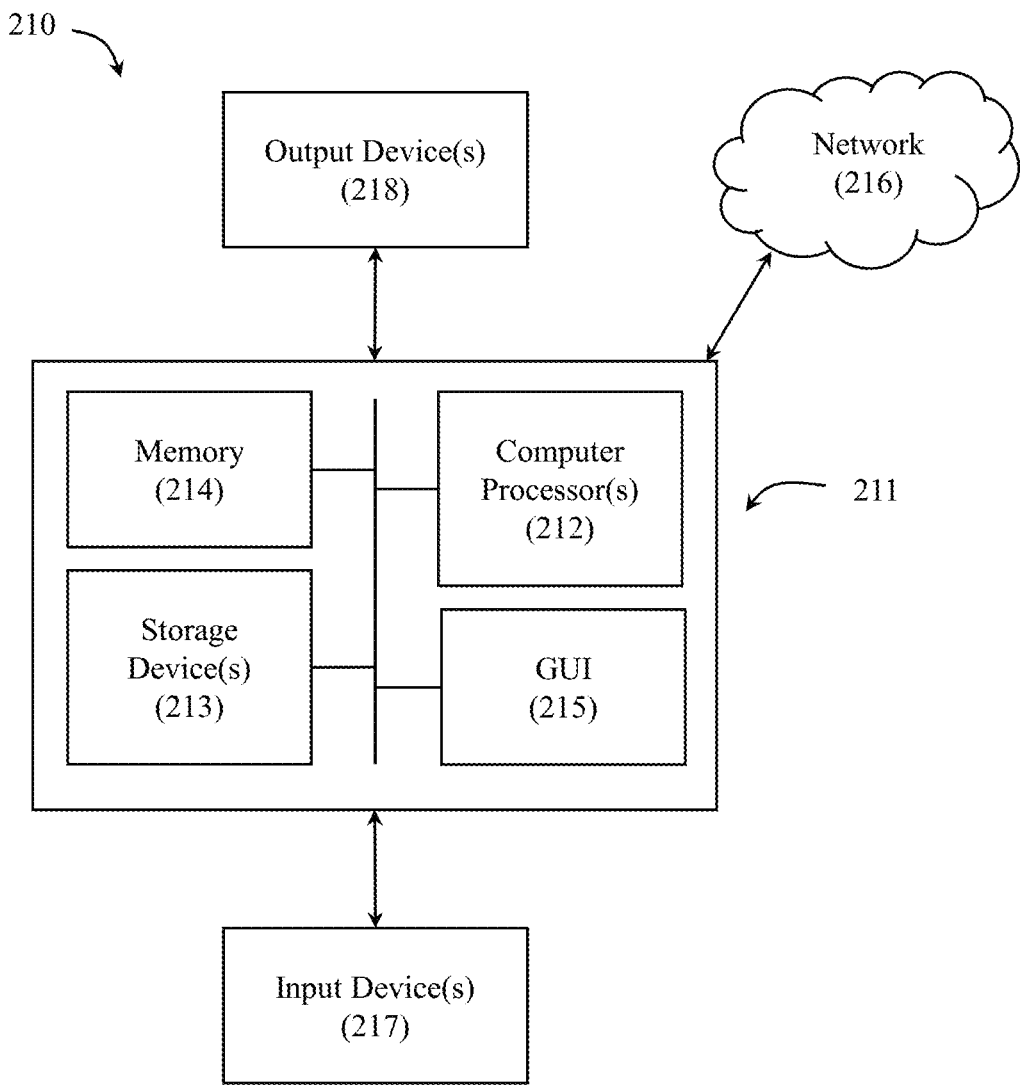
FIG. 21 shows a system in accordance with one or more embodiments of the present disclosure.
Figure 22:
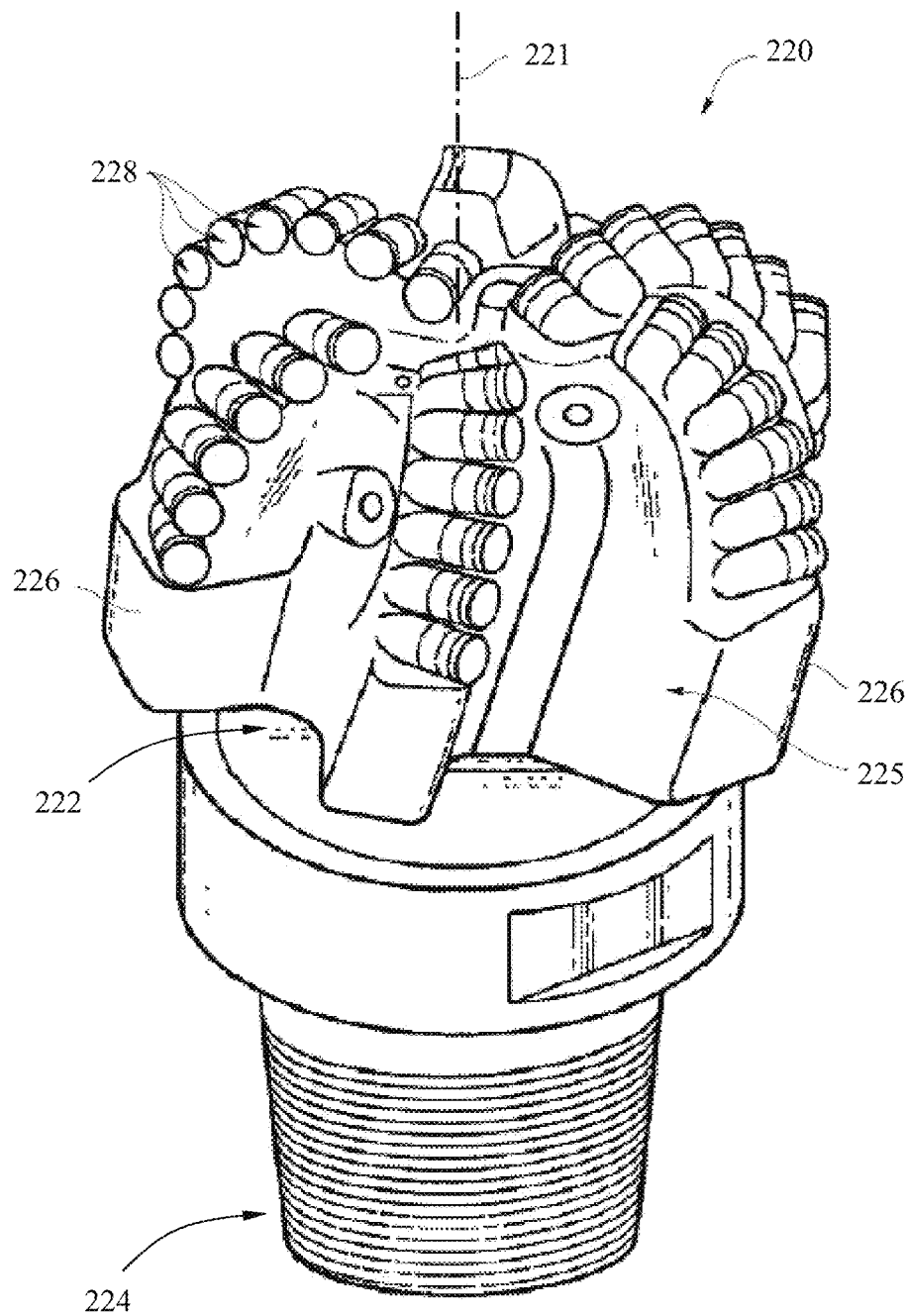
FIG. 22 shows an example of a fixed cutter drill bit.

FIG. 21 depicts a system with which one or more embodiments of present disclosure may be implemented. One or more of the modules and elements shown in FIG. 21 may be omitted, repeated, and/or substituted. For example, embodiments of forming a digital rock library, collecting digital rock interaction files, virtually testing in a digital rock lab, and/or designing drilling applications should not be considered limited to the specific arrangements of modules shown in FIG. 21.

Referring to FIG. 21, a system 210 includes a computing device 211 having one or more computing processors 212, one or more storage devices 213 (e.g., a hard disk, an optical drive such as a compact disk (CD) drive or digital versatile disk (DVD) drive, a flash memory stick, etc.), memory 214 (e.g., random access memory (RAM), cache memory, flash memory, etc.), and a graphical user interface (GUI) 215. The computing processor(s) 212 may be an integrated circuit for processing instructions. For example, the computing processor(s) may be one or more cores, or micro-cores of a processor. The storage device(s) 213 (and/or any information stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The storage device(s) 213 may be a device internal to the computing device 211. Alternatively, the storage device(s) 213 may be an external storage device operatively connected to the computing device 211. Additionally, the computing device 211 may include numerous other elements and functionalities.

The computing device 211 may be communicatively coupled to a network 216 (e.g., a local area network (LAN), a wide area network (WAN) such as the Internet, mobile network, or any other type of network) through wires, cables, fibers, optical connectors, a wireless connection, or a network interface connection (not shown).

The system 210 may also include one or more input device(s) 217, such as a touchscreen, keyboard, mouse, microphone, touchpad, electronic pen, or any other type of input device. Further, the system 210 may include one or more output device(s) 218, such as a screen (e.g., a liquid crystal display (LCD), a plasma display, touchscreen, cathode ray tube (CRT) monitor, projector, 2D display, 3D display, or other display device), a printer, external storage, or any other output device. One or more of the output device(s) 218 may be the same or different from the input device(s) 217. The input and output device(s) may be locally or remotely (e.g., via the network 216) connected to the computer processor(s) 212, memory 214, storage device(s) 213, and GUI 215. Many different types of systems exist, and the aforementioned input and output device(s) may take other forms.

Further, one or more elements of the aforementioned system 210 may be located at a remote location and connected to the other elements over a network 216. Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources. For example, a digital rock library may be formed using a computing device corresponding to a first node, and digital rock interaction files may be formed by virtually testing on a computing device corresponding to a second node, where the digital rock library may be accessed from the second node over the network 216.

The GUI 215 may be operated by a user (e.g., an engineer, a designer, an operator, an employee, or any other party) using one or more input devices 217, and the GUI 215 may be visualized by one or more output devices 218 coupled to the computing device 211. The GUI 215 may include one or more buttons (e.g., radio buttons), data fields (e.g., input fields), banners, menus (e.g., user input menus), boxes (e.g., input or output text boxes), tables (e.g., data summary tables), sections (e.g., informational sections or sections capable of minimizing/maximizing), screens (e.g., welcome screen or home screen), and/or user selection menus (e.g., drop down menus). In addition, the GUI 215 may include one or more separate interfaces and may be usable in a web browser or as a standalone application.

Although the output device(s) 218 is shown as being communicatively coupled to the computing device 211, the output device(s) 218 may also be a component of the computing device 211.

In FIG. 21, the computing device 211 is capable of simulating a rock (to form a digitized rock sample), simulating drilling equipment (including, e.g., cutting elements, drill bits, and other bottomhole assembly (BHA) components), and simulating drilling interactions (e.g., virtual tests between a modeled cutting element and digitized rock sample), as described herein. For example, a virtual test of cutting a digitized rock sample with a modeled cutting element may include selecting, by a user, a digitized rock sample from a pre-existing digital rock library and a cutting element from a pre-existing library of modeled cutting elements using the GUI 215 of the computing device 211. The user may customize the virtual test by inputting or selecting a variety of cutting conditions, such as vertical load, cutting speed, and depth of cut.

Additionally, simulations of rock cutting may be customized by inputting or selecting a variety of rock interaction parameters, modeled cutting elements may be customized by inputting or selecting a variety of cutting element design parameters (e.g., material composition, shape, and size), digitized rock samples may be modified by altering or inputting rock parameters (e.g., grain size, rock type, crystalline microstructure, size, and shape), and/or simulations of drilling with the cutting elements and/or digitized rock samples may be customized by inputting or selecting a variety of wellbore parameters, drilling parameters, and/or BHA parameters. To modify and/or customize a simulation, the user may access storage devices(s) 213 using any input means known in the art (e.g., input device(s) 217). The storage device(s) 213 is capable of having data stored thereon and may include, for example, a digital rock library (including one or more digitized rock samples), modeled cutting elements, digital rock interaction files, bit and/or BHA parameters and components, wellbore parameters, and/or drilling operating parameters, among many others. Once the user selects or customizes the simulation parameters, the computing device 211 may execute instructions on the computing processor(s) 212 to perform a simulation based on the parameters selected or inputted by the user.

Simulations may be performed using one or more of the methods disclosed herein. Executing a simulation generates a set of performance data. In some cases, the set of performance data generated may depend on the data selected or input by the user and may include instructions to generate specific performance data.

After simulation, the performance data may be visualized by the GUI 215 on the output device(s) 217 (e.g., as shown in FIGS. 13-18). In one embodiment, the visual outputs may include tabular data of one or more performance parameters. Additionally, the outputs may be in the form of graphs and may be represented as percentages or ratios. In some embodiments, a graphical visualization of the cutting elements, digitized rock samples, a scraping test, borehole, drill bit, and/or blades may be output. The graphical visualization (e.g., 2-D, 3-D, or 4-D) may include a color scheme.

Once presented with performance data, the user may modify at least one simulation parameter, which may include selecting a parameter from pre-existing values or inputting the parameter to obtain a modified output. Modified simulation parameters may be selected, for example, from real field data, which may be used to calibrate the simulations.

After modification, a second simulation may be executed by the computing device 211. The second simulation may include the modified parameter to be simulated. The simulation may be executed by the computing device 211 using the processor(s) 212 to generate a second set of performance data. Once generated, the initial set of performance data along with the second set of performance data may be presented using GUI 215 and output device(s) 218. The sets of performance data may be presented to the user for comparison and may be presented separately or combined. The sets of performance data may be presented or visualized using any tools known in the art, such as, for example, plots, graphs, charts, and logs.

Additionally, a second simulation may occur simultaneously with the first simulation. For example, an engineer may select multiple different modeled cutting elements to simulate cutting a digitized rock sample in order to compare the cutting elements. In another example, an engineer may select a number of BHAs to operate in particular wellbore and drilling operating conditions. The engineer may then run a simulation of the number of BHAs in order to compare one BHA to another. Furthermore, the simulation and thus, the comparison, may be done in real-time. More specifically, the engineer may simulate a number of BHAs in a given drilling scenario and observe their behaviors and/or performance with respect to each other as the simulation progresses. Additionally, an engineer may observe the quality of the borehole being drilled by the one or more BHAs and select or modify one or more of the aforementioned parameters accordingly in order to achieve desired performance results or a desired wellbore quality.

In other embodiments, the computing device 211 may be used to plan a well or modify a given well plan. The computing device 211 may perform a simulation to generate one or more wellbore quality factors. The simulation may be performed based on a pre-determined well plan and/or a proposed well plan. The simulation may also include a number of pre-determined and/or proposed wellbore, drilling, and/or operating parameters. Based on the generated one or more wellbore quality factors, an operating, wellbore, and/or drilling parameter may be modified. Further, in addition to, or in the alternative, a well planning parameter may be modified based on the one or more wellbore quality factors generated by the simulation.

Using the modified parameter, a second simulation may be performed by the computing device 211 in order to generate a second wellbore quality factor. Thereafter, the first and second wellbore quality factors may be compared to one another or may be compared to a given criteria. Based on the comparison, a well planning parameter, such as wellbore trajectory, and/or any other well planning parameter noted above, may be modified in order to optimize a particular well plan and/or achieve better well quality. Modification of any number of parameters, such as cutting element selection and cutting element placement and orientation, among others, may be repeated until a desired well plan or wellbore quality is obtained. The desired well plan may then be implemented in an oilfield operation.

During implementation, data may be acquired and/or measured in the field. The obtained data may then be used to compare to one or more field acquired/measured parameters to one or more parameters generated by simulation. Additionally, obtained field data may be used as input to a simulation in real time, such that one or more parameters may be generated by simulations based on the obtained field data. Thereafter, real time modifications to a well plan may be made in order to optimize the oilfield operation. Real time modification may be beneficial in remedying any unforeseen conditions or improbable situations that may have not been considered during the initial well plan, such as, inhomogeneity of a particular formation, unexpected drill bit failure, and/or inconsistent and/or one or more uncontrollable operating parameters.

By using embodiments disclosed herein, cutting element design and testing may be performed in a shortened time scale. For example, digital rock labs disclosed herein may be used to test cutting performance of a cutting element having a selected design with a digitized rock sample modeling a selected rock type. Compared to traditional physical experiments, virtual testing in a digital rock lab may provide accurate information for comparing cutting efficiency, visualization of the rock chipping process, and simulation of the cutting element dynamic stress, which may be used to provide a more reliable evaluation of the cutting element durability. Further, virtual testing using a digital rock lab according to embodiments of the present disclosure may output more realistic and useful results than a lab test because the virtual testing can intelligently learn from real world applications and address application specific factors.

Through enhanced analysis of cutting element and rock interaction, digital rock labs of the present disclosure may also be used to more efficiently design cutting element applications, such as in drill bits and other cutting tools. For example, a new application design can be virtually field tested across the spectrum of digital rock types to find the best performance opportunities and penetrate existing markets. Digital rock labs may also improve overall drilling system development. For example, digital rock interaction files may be directly inputted into a drilling simulation program (e.g., IDEAS), to capture the performance of new and dull cutting elements as a well is drilled. This may enable mutt-scale virtual field testing that can be used to predict cutting element forces/durability/chip formation, bit dynamics, and the overall BHA performance optimization.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method, comprising:
    modeling a rock of a physical formation using a computer modeling program to form a digitized rock sample;
    simulating a cutting element cutting the digitized rock sample;
    storing in a digital rock interaction file, outputs from the simulating of the cutting element cutting the digitized rock sample;
    modeling a drill bit that includes the simulated cutting element, based at least in part on information in the digital rock interaction file;
    drilling the physical formation using a physical drill bit to obtain rock interaction data between the physical drill bit and the physical formation, wherein the physical drill bit has a design that is substantially the same as the drill bit model;
    calibrating the simulating of the cutting element cutting the digitized rock sample based on one or more differences between the rock interaction data and the outputs of the simulating stored in the digital rock interaction file;
    storing outputs from the calibrated simulating in the digital rock interaction file;
    using data in the digital rock interaction file to simulate the drill bit model in a drilling operation; and
    selecting a type of cutting element to use on the physical drill bit based at least in part on the digital rock interaction file.

2. The method of claim 1, wherein the outputs from the simulating include reaction forces between the digitized rock sample and the cutting element at a depth of cut and an orientation.

3. The method of claim 1, further comprising:
    simulating a second cutting element cutting the digitized rock sample; and
    storing in a second digital rock interaction file, outputs from the simulating of the second cutting element cutting the digitized rock sample.

4. The method of claim 1, wherein the cutting element includes an ultrahard material table disposed on a substrate and a non-planar cutting face formed on an opposite side of the ultrahard material table from the substrate.

5. The method of claim 1, wherein the digitized rock sample is a model of an anisotropic rock that includes a plurality of distributed anisotropic features.

6. The method of claim 1, further comprising:
    performing a second simulation of the cutting element cutting a second digitized rock sample, wherein the second digitized rock sample is a model of a second rock in the physical formation; and
    storing in a second digital rock interaction file, outputs from the second simulation of the cutting element cutting the second digitized rock sample.

7. The method of claim 1, further comprising:
    altering at least one design parameter of the drill bit model based on the rock interaction data; and
    simulating the altered drill bit model in the drilling operation.

* * * * *